(12) United States Patent
Wen et al.

(10) Patent No.: US 12,498,224 B2
(45) Date of Patent: Dec. 16, 2025

(54) POSITIONING SYSTEM AND POSITIONING METHOD

(71) Applicant: INDUSTRIAL TECHNOLOGY RESEARCH INSTITUTE, Hsinchu (TW)

(72) Inventors: Yi-Lun Wen, Taoyuan (TW); Chung-Hsien Wu, Hsinchu (TW)

(73) Assignee: INDUSTRIAL TECHNOLOGY RESEARCH INSTITUTE, Hsinchu (TW)

( * ) Notice: Subject to any disclaimer, the term of this patent is extended or adjusted under 35 U.S.C. 154(b) by 387 days.

(21) Appl. No.: 18/085,013

(22) Filed: Dec. 20, 2022

(65) Prior Publication Data

US 2024/0183664 A1  Jun. 6, 2024

(30) Foreign Application Priority Data

Dec. 1, 2022  (TW) .................................. 111146136

(51) Int. Cl.
  *G01C 21/00*    (2006.01)
  *G06T 7/73*     (2017.01)
  *B64C 39/02*    (2023.01)

(52) U.S. Cl.
  CPC .............. *G01C 21/005* (2013.01); *G06T 7/73* (2017.01); *B64C 39/024* (2013.01);
  (Continued)

(58) Field of Classification Search
  CPC ...... G01C 21/005; G01C 21/00; G01C 21/20; G06T 7/73; G06T 2207/30204;
  (Continued)

(56) References Cited

U.S. PATENT DOCUMENTS 5,974,170 A * 10/1999 Louis ...................... G06V 20/13
                                              348/E13.016
7,852,262 B2  12/2010 Namineni et al.
(Continued)

FOREIGN PATENT DOCUMENTS

CN       110501736 A   11/2019
CN       107339990 B    5/2020
(Continued)

OTHER PUBLICATIONS

CN-114076970-A machine translation (Year: 2022).*
(Continued)

*Primary Examiner* — Angelina M Shudy
(74) *Attorney, Agent, or Firm* — Birch, Stewart, Kolasch & Birch, LLP

(57) ABSTRACT

A positioning system for providing an environmental positioning information of a field using monocular vision is disclosed. The positioning system is configured to provide an environmental positioning information of a field having a plurality of virtual floors corresponding to different heights, wherein each of the virtual floors has a plurality of marking positions. The positioning system includes a computing device configured to generate an environmental positioning information according to a first environmental image. The environmental positioning information has a positioning accuracy having various levels corresponding to the marking positions of each of the virtual floors. The computing device is further configured to divide each of the virtual floors into a plurality of work zones according to the positioning accuracy corresponding to the making positions.

18 Claims, 17 Drawing Sheets

(52) U.S. Cl.
CPC ............... B64U 2201/104 (2023.01); G06T 2207/20221 (2013.01); G06T 2207/30204 (2013.01)

(58) Field of Classification Search
CPC ........ G06T 2207/20221; B64C 39/024; B64U 2201/104; G01S 11/00; G01S 19/485; G05D 1/00
See application file for complete search history.

(56) References Cited

U.S. PATENT DOCUMENTS

| | | | | |
|---|---|---|---|---|
| 8,600,192 | B2* | 12/2013 | Liu | G06T 7/73 382/285 |
| 8,620,089 | B1* | 12/2013 | Korah | G06V 20/176 382/173 |
| 9,408,175 | B2* | 8/2016 | MacGougan | H04B 7/18519 |
| 9,785,857 | B2 | 10/2017 | Moshfeghi | |
| 10,412,701 | B2 | 9/2019 | Wu et al. | |
| 10,467,775 | B1* | 11/2019 | Waggoner | G06T 3/10 |
| 12,055,947 | B1* | 8/2024 | Sharma | G05D 1/628 |
| 2009/0043504 | A1* | 2/2009 | Bandyopadhyay | G01S 19/49 701/469 |
| 2011/0248995 | A1* | 10/2011 | Vaughan | G06V 30/1823 345/420 |
| 2012/0158177 | A1 | 6/2012 | Lee et al. | |
| 2013/0166195 | A1* | 6/2013 | Bandyopadhyay | G01C 21/3438 701/469 |
| 2015/0153172 | A1* | 6/2015 | Starns | G01C 11/02 382/284 |
| 2015/0264259 | A1* | 9/2015 | Raghoebardajal | G06T 3/12 348/36 |
| 2017/0013407 | A1* | 1/2017 | MacGougan | H04W 4/20 |
| 2017/0140537 | A1* | 5/2017 | Jia | H04N 13/204 |
| 2017/0323572 | A1* | 11/2017 | Chan | G08G 5/34 |
| 2019/0019062 | A1* | 1/2019 | Fukui | G06V 20/58 |
| 2019/0031346 | A1* | 1/2019 | Yong | G08G 5/59 |
| 2019/0250625 | A1* | 8/2019 | Kleiner | A47L 9/0488 |
| 2020/0202140 | A1* | 6/2020 | Simon | G05D 1/0253 |
| 2020/0342672 | A1* | 10/2020 | Schmelig | G06T 19/006 |
| 2021/0110137 | A1* | 4/2021 | Kerzner | G06F 18/2413 |
| 2021/0125397 | A1* | 4/2021 | Moulon | G06T 17/00 |
| 2021/0229834 | A1* | 7/2021 | Howard | G05D 1/0094 |
| 2021/0405654 | A1* | 12/2021 | Ulun | G05D 1/2446 |
| 2022/0028156 | A1* | 1/2022 | Boyadzhiev | G06T 15/10 |
| 2022/0148444 | A1* | 5/2022 | Lo | G08G 5/50 |
| 2022/0269266 | A1* | 8/2022 | Lesonen | H04N 7/183 |
| 2023/0092896 | A1* | 3/2023 | Zuckerman | G05D 1/12 705/338 |
| 2023/0152821 | A1* | 5/2023 | Wang | G05D 1/101 701/3 |
| 2023/0161341 | A1* | 5/2023 | Montoya | B64D 43/00 701/3 |
| 2023/0175861 | A1* | 6/2023 | Günther | G06V 10/774 348/135 |
| 2023/0365257 | A1* | 11/2023 | Reichenbach | G06V 20/17 |
| 2024/0029535 | A1* | 1/2024 | Badat | G06V 10/764 |
| 2024/0104879 | A1* | 3/2024 | Jiang | G06V 10/245 |
| 2024/0176366 | A1* | 5/2024 | Mclaughlin | B64U 70/92 |
| 2024/0185464 | A1* | 6/2024 | Oi | H04N 17/002 |
| 2024/0221211 | A1* | 7/2024 | Kuo | G06T 7/73 |
| 2024/0324838 | A1* | 10/2024 | Ebrahimi Afrouzi | G05D 1/2446 |

FOREIGN PATENT DOCUMENTS

| | | | | |
|---|---|---|---|---|
| CN | 113012212 | A | | 5/2021 |
| CN | 113108793 | A | | 7/2021 |
| CN | 114076970 | A * | 2/2022 | .......... G01C 21/165 |
| CN | 114216454 | A | | 3/2022 |
| CN | 114581516 | A | | 6/2022 |
| TW | 201219813 | A1 | | 5/2012 |
| TW | 201235808 | A1 | | 9/2012 |
| TW | I671740 | B | | 9/2019 |

OTHER PUBLICATIONS

Hu et al., "A Survey on Visual Surveillance of Object Motion and Behaviors", IEEE Transactions on Systems, Man, and Cybernetics—Part C: Applications and Reviews, Aug. 2004, vol. 34, No. 3, pp. 334-352.

Khan et al., "A Multiview Approach to Tracking People in Crowded Scenes using a Planar Homography Constraint", Lecture Notes in Computer Science, May 2006, pp. 133-146.

Kim et al., "InFo: Indoor localization using Fusion of Visual Information from Static and Dynamic Cameras", 2019 International Conference on Indoor Positioning and Indoor Navigation (IPIN), Sep. 30-Oct. 3, 2019, total 8 pages.

Wang et al., "Applicability of 3GPP Indoor Hotspot Models to the Industrial Environments", 2018 8th International Conference on Localization and GNSS (ICL-GNSS), Jun. 26-28, 2018, total 5 pages.

Zhang, "A Flexible New Technique for Camera Calibration", Technical Report MSR-TR-98-71, Dec. 2, 1998, pp. 1-21.

Zhichao et al., "Mono Camera and Laser Rangefinding Sensor Position-Pose Measurement System", Acta Optica Sinica, Mar. 2011, vol. 31, No. 3, pp. 0312001-1 to 0312001-7.

Zhu et al., "Seamless Indoor-Outdoor Infrastructure-free Navigation for Pedestrians and Vehicles with GNSS-aided Foot-mounted IMU", 2019 International Conference on Indoor Positioning and Indoor Navigation (IPIN), Sep. 30-Oct. 3, 2019, total 8 pages.

Taiwanese Office Action and Search Report for Taiwanese Application No. 111146136, dated Jun. 29, 2023.

* cited by examiner

POSITIONING SYSTEM AND POSITIONING METHOD

This application claims the benefit of Taiwan application Serial No. 111146136, filed Dec. 1, 2022, the disclosure of which is incorporated by reference herein in its entirety.

TECHNICAL FIELD

The present disclosure relates to a positioning system and a positioning method.

BACKGROUND

As the progress of technology, unmanned aerial machine (UAM) has been widely used in various aspects of life. The UAM, for example, is an unmanned aerial vehicle (UAV). To navigate the UAM, a global navigation satellite system (GNSS) information may be used to position the UAM. However, in areas where the reception of satellite signal is poor, it is difficult to position the UAM using the GNSS information.

Besides the GNSS information, positioning may be performed using image information provided by environmental cameras. For instance, several high-speed cameras may be disposed in a field where an UAM operates, so as to shoot specific marks of the UAM from different angles. Also, the UAM may perform positioning using a "simultaneous localization and mapping (SLAM)" function.

In addition to the above methods for positioning the UAM using the GNSS information, the high-speed cameras or the SLAM function of an UAM, current research and development in the industries is directed towards easier UAM positioning methods.

SUMMARY

According to one embodiment, a positioning system for providing an environmental positioning information of a field using monocular vision is disclosed. The positioning system is configured to provide an environmental positioning information of a field having a plurality of virtual floors corresponding to different heights, wherein each virtual floor has a plurality of marking positions. The positioning system includes a computing device configured to generate an environmental positioning information according to a first environmental image. The environmental positioning information has a positioning accuracy having various levels corresponding to the marking positions of each virtual floor. The computing device is further configured to divide each virtual floor into a plurality of work zones according to the positioning accuracy corresponding to the making positions.

According to another embodiment, a positioning method for providing an environmental positioning information of a field using monocular vision is disclosed. The field has a plurality of virtual floors corresponding to different heights, wherein each virtual floor has a plurality of marking positions. The positioning method includes the following steps. An environmental positioning information is generated according to a first environmental image, wherein the environmental positioning information has a positioning accuracy having various levels corresponding to the marking positions of each virtual floor. Each virtual floor is divided into a plurality of work zones according to the positioning accuracy corresponding to the making positions.

According to the above technical solutions of the present disclosure, with the fusion of the sensing information provided by the operation target, the positioning accuracy of the environmental positioning information provided by the monocular environmental camera may further be enhanced. Thus, the present disclosure may achieve precise positioning with monocular environmental camera, hence greatly reducing the hardware cost of the positioning system and at the same time saving the computing resource of the operation target (such as an UAM).

The above and other aspects of the invention will become better understood with regard to the following detailed description of the preferred but non-limiting embodiment (s). The following description is made with reference to the accompanying drawings.

Figure 1A:
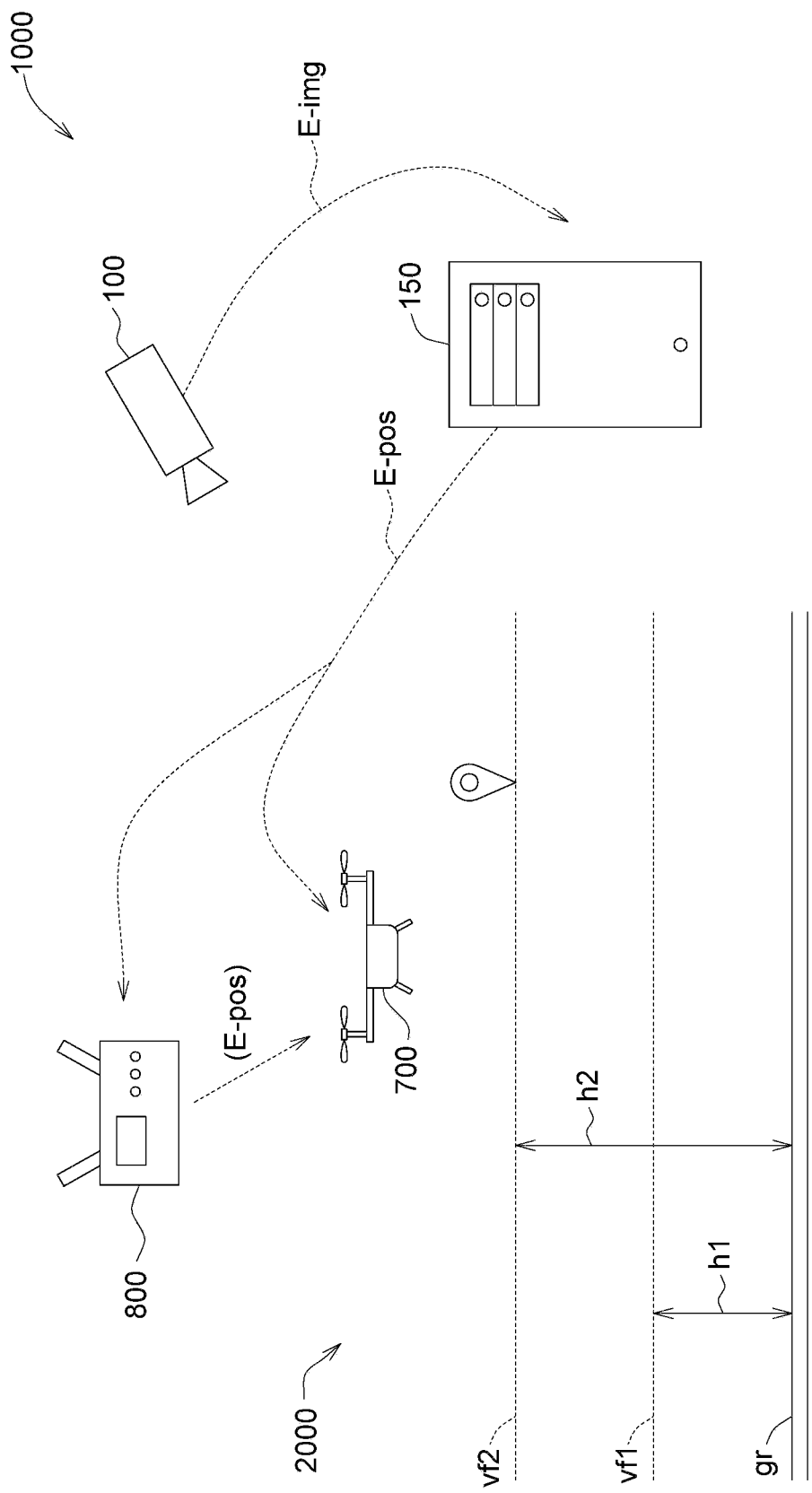
FIGS. 1A and 1B are schematic diagrams of a positioning system 1000 according to an embodiment of the present disclosure, which is applied to a field 2000.

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

DETAILED DESCRIPTION

Technical terms are used in the specification with reference to the prior art used in the technology field. For any terms described or defined in the specification, the descriptions and definitions in the specification shall prevail. Each embodiment of the present disclosure has one or more technical features. Given that each embodiment is implementable, a person ordinarily skilled in the art may selectively implement or combine some or all of the technical features of any embodiment of the present disclosure.

In response to the technical problems encountered for positioning an unmanned aerial machine (UAM) using a global navigation satellite system (GNSS) information, several high-speed cameras or the simultaneous localization and mapping (SLAM) module of the UAM, the present disclosure provides following technical solutions. An environmental positioning information corresponding to the virtual floors of different heights is generated according to an environmental image provided by simple environmental monocular camera. Through the analysis in the marking image of the marking object placed at each marking position of a virtual floor, corresponding positioning information of each marking position may be generated, and the positioning accuracy of the positioning information may be evaluated. Each virtual floor is divided into several work zones according to the positioning accuracy, and the operation target (such as an UAM) may operate in proper work zones according to the needs of a designated task. Besides, the sensing information provided by the operation target may be fused to the environmental positioning information to increase the positioning accuracy of the positioning information.

Figure 1B:
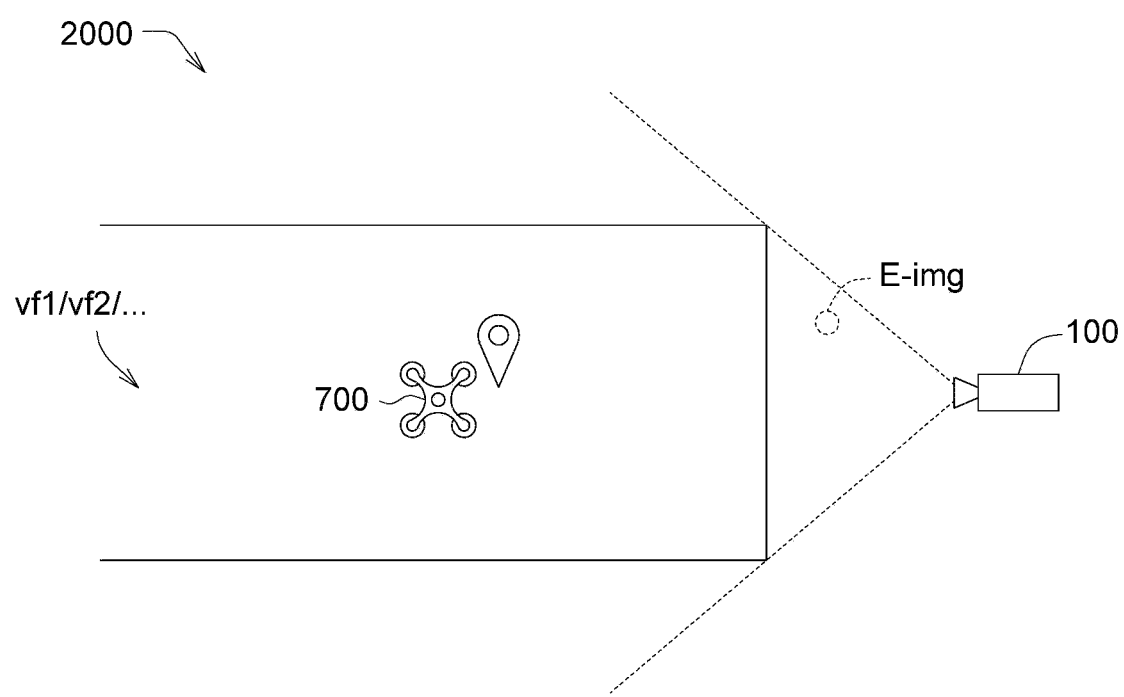

FIGS. 1A and 1B are schematic diagrams of a positioning system 1000 according to an embodiment of the present disclosure, which is applied to a field 2000. FIG. 1A is a side view relative to the field 2000, and FIG. 1B is a top view relative to the field 2000. Referring to both FIGS. 1A and 1B, the positioning system 1000 is configured to generate an environmental positioning information E-pos of the field 2000.

In one example, the positioning system 1000 provides an environmental positioning information E-pos to an operation target 700, and positions and/or navigates the operation target 700 according to the environmental positioning information E-pos, so that the operation target 700 may operate in the field 2000 according to the environmental positioning information E-pos. In another example, the positioning system 1000 may also provide an environmental positioning information E-pos to a ground control station 800, which controls the operation target 700 to operate in the field 2000 according to the environmental positioning information E-pos. The positioning system 1000 may position and/or navigate the operation target 700 using an GNSS information in cooperation with the environmental positioning information E-pos. Alternatively, under the circumstance where the GNSS information cannot be received, the positioning system 1000 may still position the operation target 700 according to the environmental positioning information E-pos.

The operation target 700 may be, e.g., an unmanned aerial vehicle (UAV) or other types of robot. The field 2000 may be an outdoor field or an indoor field. When the field 2000 is an indoor field, it may be a warehouse or a production line in a factory. In an example, the operation target 700 may carry goods and may be navigated to a predefined position of the warehouse so as to place the goods on the shelf, according to the environmental positioning information E-pos provided by the positioning system 1000.

The positioning system 1000 includes a first camera 100 and a computing device 150. The first camera 100 may be, e.g., an environmental monocular camera. The first camera 100 is configured to generate an environmental image E-img of the field 2000 using monocular vision. In an embodiment, the monocular vision is, e.g., a positioning calculation for a region, using the information of a camera only. The computing device 150 may be, e.g., a portable computing device (such as a mobile phone, a PC tablet, a laptop, a wearable device, and so on) or a fixed computing device (such as a desktop, a server host, a mass workstation, a cloud server, and so on). In another example, the computing device 150 may be a computing circuit or a computing processor, such as a central processing unit (CPU), a micro-processor, a microcontroller unit (MCU), an application specific integrated circuit (ASIC), a field programmable gate array (FPGA), and so on. The computing device 150 is configured to process an environmental image E-img to obtain the environmental positioning information E-pos. Moreover, the computing device 150 divides the field 2000 into a plurality of work zones according to the environmental positioning information E-pos, wherein the work zones respectively have various levels of positioning accuracy.

Take the ground gr of the field 2000 as a baseline for measurement of the height. A plurality of virtual floors corresponding to different heights are set in the field 2000. Taking two virtual floors as an example, i.e., virtual floors vf1 and vf2, wherein the virtual floor vf1 corresponds to height h1, and the virtual floor vf2 corresponds to height h2. The field 2000 may include more virtual floors, such as virtual floor vf3, virtual floor vf4, . . . , and so on (not illustrated in FIGS. 1A and 1B). The first camera 100 generates an environmental image E-img for each virtual floor, and the computing device 150 generates an environmental positioning information E-pos according to corresponding environmental image E-img of each virtual floor.

Figure 2A:
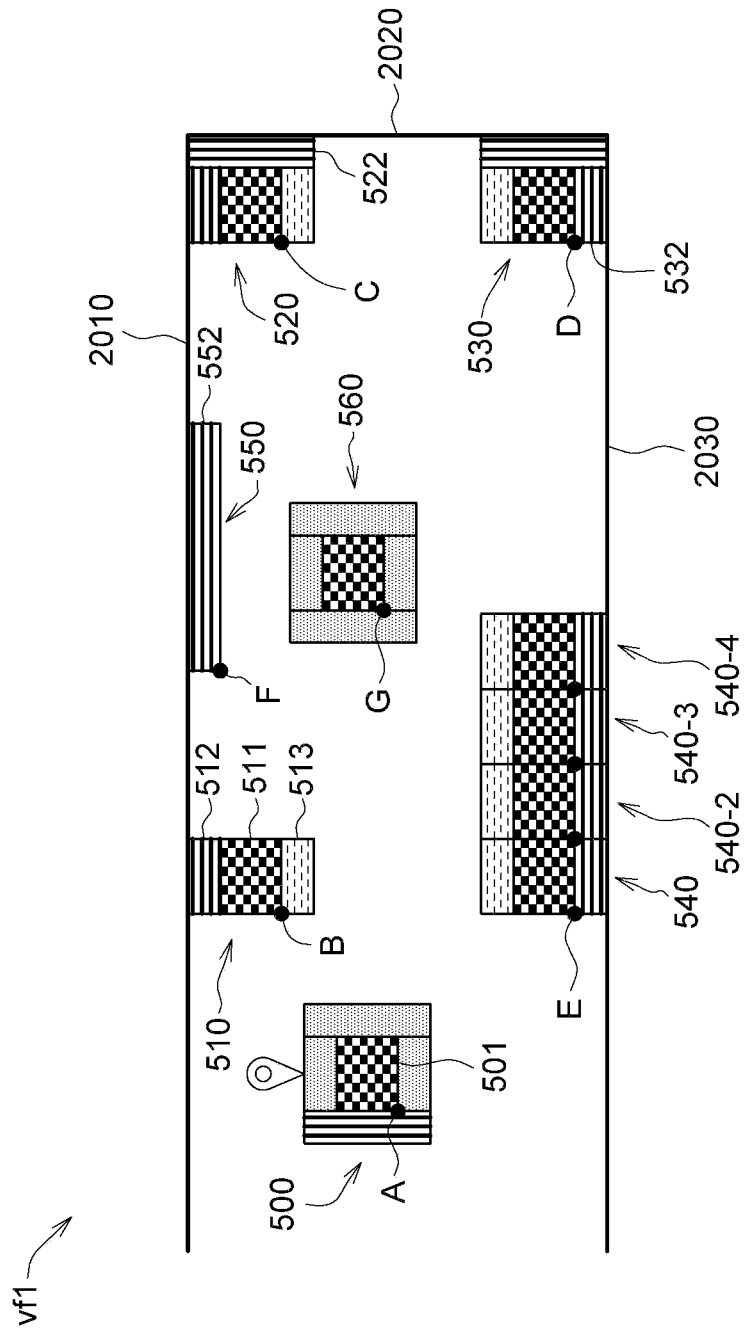
FIGS. 2A and 2B are schematic diagram of generating the environmental image E-img and the environmental positioning information E-pos corresponding to the virtual floor vf1.
Figure 2B:
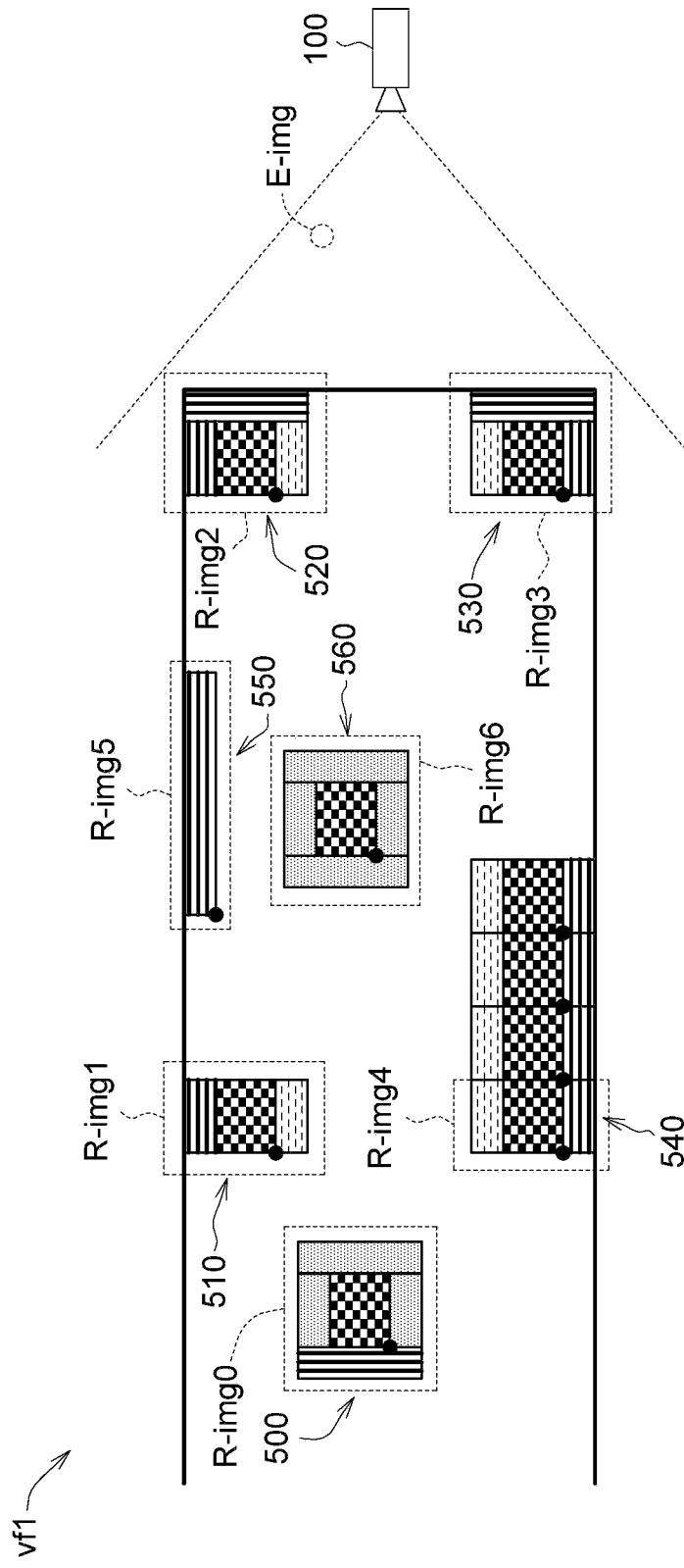

FIGS. 2A and 2B are schematic diagram of generating the environmental image E-img and the environmental positioning information E-pos corresponding to the virtual floor vf1. Referring to both FIGS. 2A and 2B, the virtual floor vf1 with height h1 has a plurality of marking positions, such as marking position A, marking position B, marking position C, marking position D, marking position E, marking position F and marking position G, and marking objects are placed at these marking positions A~G, respectively.

Taking the marking position B as an example, a marking object 510 is placed at the marking position B, and a first camera 100 shoots the marking object 510 to generate a marking image R-img1 of the marking object 510. The marking image R-img1 is contained in the environmental image E-img. The marking object 510, such as a reference board (RB), has a predefined pattern. The predefined pattern includes, e.g., an accuracy positioning pattern and/or a boundary positioning pattern. In an embodiment, the accuracy positioning pattern is used to obtain the position of a positioning reference point and a positioning accuracy of the region at which the marking object 510 is located. In an embodiment, the boundary positioning pattern is used to position the boundaries of the field 2000. In an embodiment, the accuracy positioning pattern is a grid pattern 511, and the boundary positioning pattern is a bar pattern 512. That is, the marking object 510 may include the grid pattern 511 only, the bar pattern 512 only, or both the grid pattern 511 and the bar pattern 512. Hereinafter, the accuracy positioning pattern is exemplified by the grid pattern, and the boundary positioning pattern is exemplified by the bar pattern.

In an embodiment, the grid pattern 511 is disposed at the middle region of the marking object 510 and includes black grids or white grids staggered with each other. In an embodiment, the bar pattern 512 is disposed at the lateral region of the marking object 510 and includes black grids or white grids staggered with each other. In an embodiment, each grid of the grid pattern 511 and each bar of the bar pattern 512 have predefined lengths and predefined widths.

The predefined pattern of the marking object 510 has a boundary information for marking the boundary lines of the field 2000. The boundary information is, e.g., the style of the bar pattern 512 of the marking object 510 and/or the coordinate position information of the positioning points on the boundaries of the bar pattern 512 of the marking object 510 (the positioning points are referred to as "boundary positioning points"). For instance, the bar pattern 512 of the marking object 510 is aligned with a boundary of the field 2000. That is, the boundary 2010 is marked using the pattern edge recognition algorithm or the neural network "You Only Look Once" (YOLO) algorithm. Likewise, another marking object 520 is placed at the marking position C of the virtual floor vf1, and the bar pattern 522 of the marking object 520 is aligned with another boundary of the field 2020, that is, the boundary 2020 is marked using the bar pattern 522. Furthermore, the marking object 530 is placed at the marking position D of the virtual floor vf1, and another boundary 2030 of the field 2000 is marked using the bar pattern 532 of the marking object 530. The boundaries 2010, 2020 and 2030 of the field 2000 may be marked according to the above methods. In an embodiment, the regions outside the boundaries 2010, 2020 and 2030 are not calculated, so that the computing resources of the first camera 100 and the computing device 150 may be saved.

In an embodiment, the predefined pattern of the marking object 510 has a color information, which includes illuminance value and/or color temperature. The computing device 150 evaluates the state of the environmental light source of the field 2000 to obtain an environmental illuminance EI_value of the field 2000, according to the color information of the marking object 510. For instance, in the marking image R-img1 of the marking object 510, when the illuminance value of the predefined pattern is lower than a predefined threshold, computing device 150 evaluates that the environmental illuminance of the field 2000 is insufficient and obtains an environmental illuminance EI_value with a lower value. Meanwhile, the computing device 150 may notify the positioning system 1000 to generate a warning, which indicates that the environmental illuminance is insufficient, and positioning cannot be properly performed. In an exemplary example, the color information of the predefined pattern of the marking object 510 may be the color of the white grids of the grid pattern 511. In the marking image R-img1, when the color of white grids is gray or dark gray, the color contrast between white grids and black grids reduces, the computing device 150 evaluates that the environmental illuminance of the field 2000 is insufficient and obtains an environmental illuminance EI_value with a lower value. In another example, the predefined pattern of the marking object 500 may selectively include a short segment pattern 513 for independently or auxiliary providing color information and illuminance information. In other examples, the short segment pattern 513 may be replaced with a dot pattern.

In an embodiment, the operation target 700 has a totem with recognition purpose. White balance is calculated according to the color temperature of the predefined pattern of the marking object 510 so that the color information of the totem of the operation target 700 may be correctly converted. Besides, the image processing algorithm may be performed to correct the color in the marking image R-img1 according to the color information of the predefined pattern of the marking object 510.

In an embodiment, the same marking object (that is, reference board) may be moved to different marking positions A, B, C, D, E, F and G and are designated as marking objects 500, 510, 520, 530, 540, 550 and 560, and the pattern, position and/or angle of the marking object may be changed according to the location (for instance, whether the marking object is located at a boundary or not). Alternatively, different marking objects are placed at different marking positions A, B, C, D, E, F and G respectively and are designated as marking objects 500, 510, 520, 530, 540, 550 and 560. The marking position A is an initial position or a baseline reference position with a GNSS information. In an embodiment, four adjacent marking objects may be placed consecutively, so that better positioning information may be obtained. For instance, four adjacent marking objects 540, 540-2, 540-3 and 540-4 are consecutively placed at the vicinity of the marking position E (or, the same marking object may be horizontally moved at the vicinity of the marking position E, designated as marking objects 540, 540-2, 540-3 and 540-4), so that better positioning information may be obtained at the vicinity of the marking position E. In an embodiment, the marking object with boundary information only, is placed. For instance, the marking object 550 with boundary information only, is placed at the marking position F, for marking the boundary of the field 2000. For instance, only bar pattern 552 included in the predefined patterns of the marking object 550, providing the boundary information. In an embodiment, when the marking of a specific position of the virtual floor vf1 (such as the marking position G) needs to be enhanced, the marking object 560 is placed to provide a positioning information.

On the virtual floor vf1 corresponding to height h1, the first camera 100 shoots the marking objects 500~560 located at the marking positions A~G respectively to obtain corresponding marking images R-img0~R-img6 of the marking objects 500~560. In other words, the environmental image E-img generated by the first camera 100 may include the marking images R-img0~R-img6. There is a mapping relationship between the pixels of the environmental image E-img (and each of the marking images R-img0~R-img6) and corresponding positioning points of the marking objects 500~560 in the real environment. The computing device 150 performs marking mapping to obtain the above-mentioned mapping relationship. The positioning points of the marking objects 500~560, referred to as "marking positioning points", provide position information for marking mapping. For instance, the junction of each grid in the grid pattern 511 of the marking object 510 may be used as a positioning point, and the junction of each grid is referred as a "corner point". The corner points of the marking object 510 in the real environment may be mapped to the pixels of the marking image R-img1 according to marking mapping. The pixels mapped from the corner points are referred as "corner point pixels". Through the use of a homography matrix, the coordinate position of the corner point according to the world coordinate system in the real environment may be converted to the coordinate position of the corner point pixels of the marking image R-img1.

The arrangement angle and/or lens distortion of the first camera 100 may lead to error in the coordinate position of each pixel in the marking image R-img1 (including the corner point pixels). The computing device 150 may estimate the lens distortion coefficient of the first camera 100 using a nonlinear least squares method, then performs lens distortion correction using Zhang's algorithm, Tsai' algorithm, direct linear transformation, Weng's iterative method or Faygera's algorithm to correct the error in the coordinate position of each pixel in the marking image R-img1.

Figure 3A:
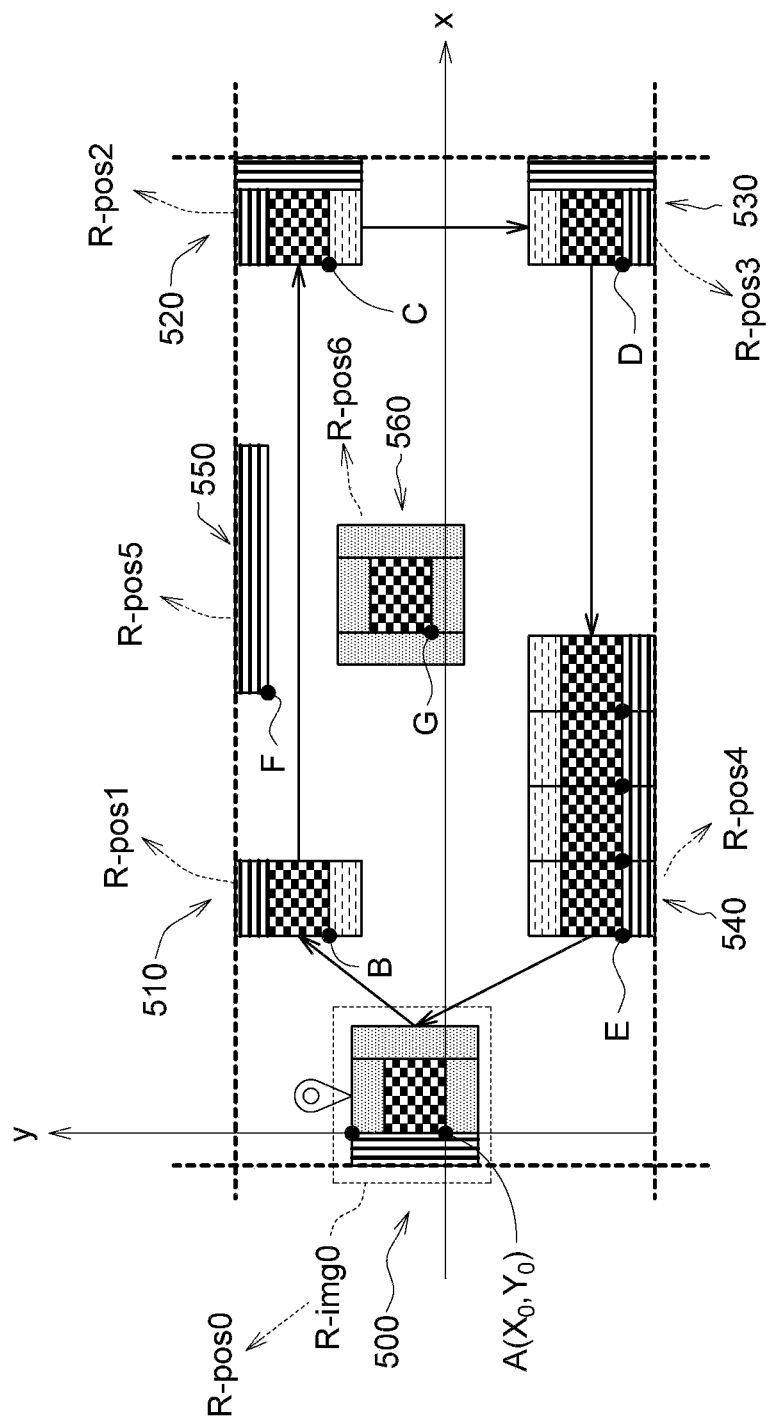
FIG. 3A is a schematic diagram of evaluating corresponding positioning accuracies of making positions A~G.

Referring to FIGS. 2A, 2B and 3A, in which FIG. 3A is a schematic diagram of evaluating corresponding positioning accuracies of making positions A~G. The computing device 150 generates the positioning information R-pos0~R-pos6 of FIG. 3A according to the mapping relationship of the marking mapping between the marking objects 500~560 in the real world and the marking images R-img0~R-img6. The positioning information R-pos0~R-pos6 are local positioning information respectively corresponding to the vicinities of the marking positions A~G of the virtual floor vf1. That is, the marking positions A~G have the positioning information R-pos0~R-pos6. Furthermore, the computing device 150 integrates the positioning information R-pos0~R-pos6 of the marking positions A~G as an overall environmental positioning information E-pos, which corresponds to the entire virtual floor vf1.

The computing device 150 further evaluates the positioning accuracy of the environmental positioning information E-pos. At distinct positions of the virtual floor vf1, the positioning accuracy of the environmental positioning information E-pos has various levels, that is, distinct positions of the virtual floor vf1 correspond to various levels of positioning accuracy. For instance, among the marking positions A~G of the virtual floor vf1, some marking positions are at a "low positioning accuracy" level, some others are at a "high positioning accuracy" level. In an embodiment, some marking positions of the virtual floor vf1 cannot provide valid positioning information, therefore the corresponding marking positions are at a "failed positioning" level. Details of the evaluation of positioning accuracy are disclosed below.

Refer to FIG. 3A, the marking position A is the real position of the actually measured marking object 500 in the real environment. In an exemplary example, the positioning system 1000 may receive a GNSS information, and the marking position A is a baseline reference position with the GNSS information. In another example, when the positioning system 1000 cannot receive the GNSS information, the marking position A may be the reference position with least error on the lowest virtual floor (that is, the virtual floor vf1). The marking position A whose position information has higher accuracy is used as a "confidence point". In the environmental image E-img generated by the first camera 100, two-dimensional (2D) coordinate system (X,Y) of the pixels may be established, and the coordinate position of the original point of the 2D coordinate system (X,Y) is set as $(X_0, Y_0)$. Through marking mapping performed by the positioning system 1000, the marking position A in the real environment is mapped to the coordinate position $(X_0, Y_0)$ of the original point.

Figure 3B:
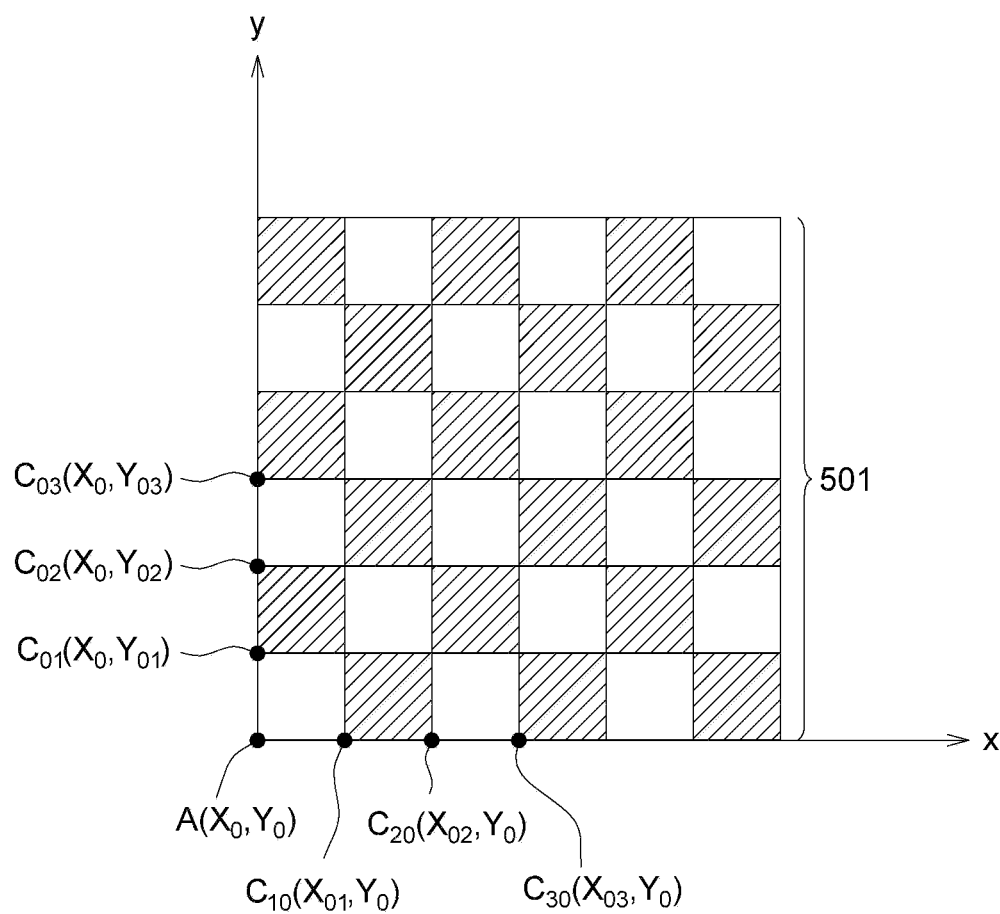
FIG. 3B, which is a schematic diagram of the mapping from the grid pattern 501 of a marking object 500 to the marking image R-img0.

Next, referring to FIG. 3B, which is a schematic diagram of the mapping from the grid pattern 501 of a marking object 500 to the marking image R-img0. The corner points of each grid of the grid pattern 501 has position information with higher accuracy and may be used as confidence points. For each grid, the predefined length is $\overline{X_0 X_{01}}$ (that is, $|X_{01}-X_0|$) and the predefined width is $\overline{Y_0 Y_{01}}$ (that is, $|Y_{01}-Y_0|$), where the predefined length and the predefined width may be used as a reliable reference standard. Take the corner point pixels on the X axis and the Y axis of the 2D coordinate system (X,Y) for instance, corner points of the grid pattern 501 of the marking object 500 in the real environment are mapped to the corner point pixels $C_{10}, C_{20}, C_{30}, C_{01}, C_{02}$ and $C_{03}$ in the marking image R-img0. Based on the relative position relationship between the corner point pixels $C_{10}, C_{20}, C_{30},$ $C_{01}, C_{02}$ and $C_{03}$ and the marking position A as well as the predefined length and the predefined width of the grids, the coordinate position of the corner point pixels $C_{10}, C_{20}$ and $C_{30}$ may be calculated as $(X_{01}, Y_0), (X_{02}, Y_0)$ and $(X_{03}, Y_0)$, and the coordinate position of the corner point pixels $C_{01}, C_{02}$ and $C_{03}$ may be calculated as $(X_0, Y_{01}), (X_0, Y_{02})$ and $(X_0, Y_{03})$. That is, based on the coordinate position $(X_0, Y_0)$ of the original point corresponding to the marking position A, the coordinate position of each of the corner point pixels may be calculated. The said coordinate positions $(X_{01}, Y_0),$ $(X_{02}, Y_0), (X_{03}, Y_0), (X_0, Y_{01}), (X_0, Y_{02})$ and $(X_0, Y_{03})$ are computed values, initially.

After the computing device 150 corrects the distortion of the marking image R-img0, the corner point pixels $C_{10}, C_{20},$ $C_{30}, C_{01}, C_{02}, C_{03}$ (and other corner point pixels) have corrected coordinate positions $(X'_{01}, Y'_0), (X'_{02}, Y'_0), (X'_{03},$ $Y'_0), \ldots, (X'_0, Y'_{01}), (X'_0, Y'_{02}), (X'_0, Y'_{03}), \ldots$, and so on. Moreover, the corrected coordinate position $(X'_0, Y'_0)$ corresponds to the coordinate position $(X_0, Y_0)$ of the original point.

Supposing that, in the corrected marking image R-img0, the distance from the marking position A to the corner point pixel $C_{10}$ (that is, the length in the X-axis direction) is equivalent to the length in real environment, and the distance from the marking position A to the corner point pixels $C_{01}$ (that is, the length in the Y-axis direction) is also equivalent to the length in the real environment. For instance, in the corrected marking image R-img0, the distance from the marking position A to the corner point pixel $C_{10}$ includes 100 pixels, and the corresponding part of the 100 pixels of the marking object 500 in the real environment has a distance of 10 cm. Thus, 100 pixels are taken from the marking image R-img0 within the range of the marking object 500 to represent 10 cm in the X-axis direction in the real environment. Similarly, the said correspondence may be used in the corresponding relationship between the number of pixels of other position within the range of the marking object 500 and actual length in the real environment.

Thus, the respective error cE of the coordinate position may be calculated according to the corner point pixels mapped from the corner point before and after the correction of the coordinate positions. The error cE of the coordinate position may be calculated according to formula (1) or formula (2):

$$cE=\sqrt{(X_{0p}-X'_{0p})^2+(Y_{0p}-Y'_{0p})^2} \qquad (1)$$

$$cE=\sqrt{(X_{0p}-X'_{0p})^2+(Y_{0q}-Y'_{0q})^2} \qquad (2)$$

Wherein p=1, 2, 3 . . . , q=1, 2, 3 . . . .

Furthermore, the overall mean error PME in the marking image R-img0 of the marking object 500 may be calculated according to formula (3):

$$PME = \frac{\sum_{i=2}^{p}\sum_{j=2}^{q}\sqrt{(X_{0i}-X'_{0i})^2+(Y_{0j}-Y'_{0j})^2}}{(p+1)(q+1)-3} \qquad (3)$$

The respective error cE and mean error PME of the coordinate position of the corner point pixels indicate that, the error of marking mapping between the marking object 500 and the marking image R-img0. Since the coordinate position $(X_{0i}, Y_{0j})$ of each of the corner point pixels corresponds to the virtual floor vf1 and has an identical height h1, the respective error cE and the mean error PME disclosed above are errors in the horizontal position. Then, the positioning accuracy of the positioning information R-pos0 corresponding to the marking position A is evaluated according to the respective error cE and the mean error PME. In an exemplary example, whether the marking object 500 has "marking failure" may be determined according to formula (4) or formula (5):

$$\|X_{0i} - X'_{0i}\| \geq \frac{\|X_{0i} - X_{0(i+1)}\|}{2} \tag{4}$$

$$\|Y_{0j} - Y'_{0j}\| \geq \frac{\|Y_{0i} - Y_{0(j+1)}\|}{2} \tag{5}$$

When the respective error cE is lower, this indicates that the corner point (that is, marking positioning point) is "recognizable". On the X axis, the total number of existing corner points of the marking object 500 is (P+1), and, on the Y axis, the total number of existing corner points of the marking object 500 is (Q+1). In an embodiment, when the number of recognizable corner point is less than the total number of existing corner points of the marking object 500, this indicates that the marking object 500 at the marking position A has "marking failure". Meanwhile, the positioning accuracy of the positioning information R-pos0 corresponding to the marking position A is evaluated as being too low (that is, the positioning accuracy is at a "failed positioning" level), and the positioning information R-pos0 is abandoned. In an embodiment, the positioning information R-pos0 is not abandoned, instead, the positioning information R-pos0 is generated from the position information of recognizable corner points of the reference marking object 500. Besides, the interval between adjacent corner points of the marking object 500 is adjusted (that is, the interval between the grids of the grid pattern 501), so as to adjust the tolerable ranges of respective error cE and mean error PME.

Likewise, refer to FIG. 3A, using the marking positions B~G as "confidence points", the coordinate positions of the corner point pixels of the marking object 510~560 in the marking images R-img1~R-img6 may be calculated, and the errors of the coordinate position of the corner point pixels of the marking object 510~560 (including the respective error CE and the mean error PME), before and after the correction of the coordinate positions, may be also calculated. Thus, corresponding positioning accuracies of the positioning information R-pos1~R-pos6 of the marking positions B~G may be evaluated according to above results of calculation. Then, the computing device 150 integrates each of the local positioning information R-pos0~R-pos6 as the environmental positioning information E-pos corresponding to the overall virtual floor vf1.

In the virtual floor vf1, the gap between each two of the marking objects 500~560 is an "unmarked region". The positioning accuracy of an unmarked region may be estimated according to the positioning accuracy of the marking object adjacent to the unmarked region. For instance, the positioning accuracy of an unmarked region may be estimated using interpolation according to the average or trend of the positioning accuracy of the edge of the marking object adjacent to the unmarked region. The distortion correction performed on the marking images R-img0~R-img6 by the computing device 150, may facilitate the estimation of the positioning accuracy of the unmarked region using interpolation.

Figure 4A:
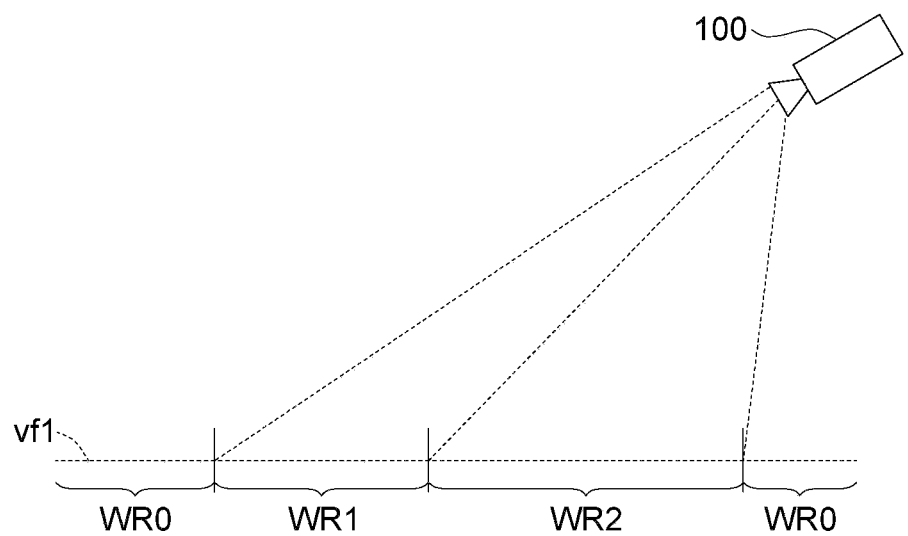
FIGS. 4A and 4B, which are schematic diagrams of dividing the virtual floor vf1 into several work zones.
Figure 4B:
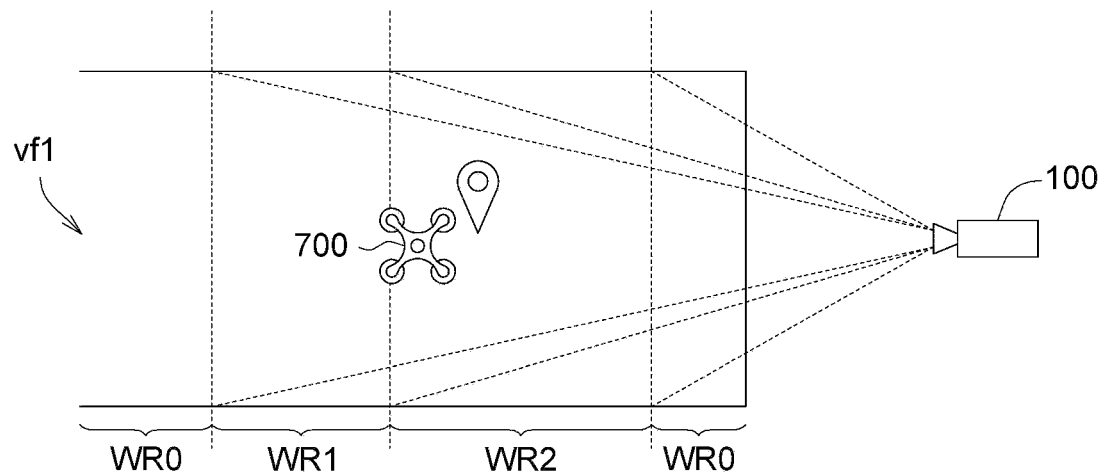

In an embodiment, based on the positioning accuracies of the positioning information R-pos0~R-pos6 of the marking positions A~G, the computing device 150 divides the virtual floor vf1 into several work zones, which respectively have various levels of positioning accuracy. Referring to both FIGS. 4A and 4B, which are schematic diagrams of dividing the virtual floor vf1 into several work zones (FIG. 4A is a side view relative to the field 2000, and FIG. 4B is a top view relative to the field 2000). In FIGS. 4A and 4B, the virtual floor vf1 is divided into three work zones WR0, WR1 and WR2. In an example, the virtual floor vf1 is divided into work zones WR0, WR1 and WR2 according to corresponding mean error PME of each marking position (as shown in formula (3)) and/or the environmental illuminance EI_value.

Since the work zone WR0 is outside the shooting range of the first camera 100, it is hard or impossible for the first camera 100 to provide a valid environmental image of the work zone WR0. The mean error PME corresponding to the marking position in the work zone WR0 is greater than the first error threshold TH_LowPre (that is, the mean error PME of marking mapping is too large), this indicates that corresponding positioning accuracy of each marking position is too low, the positioning accuracy of the work zone WR0 is at a "failed positioning" level, and the work zone WR0 is classified as a work zone where positioning accuracy is at a "failed positioning" level. That is, for the operation target 700, the work zone WR0 is an invalid work zone.

As disclosed above, based on the color information of the predefined pattern of the marking object (such as the color contrast between white grids and black grids), the computing device 150 may evaluate the state of the environmental illuminance of the field 2000 to obtain an environmental illuminance EI_value of the field 2000. When classifying the work zones, the environmental illuminance EI_value may be selectively used as a sub-condition of judgement, and the classification of work zones makes sense only when the environmental illuminance EI_value falls within the predefined range. For instance, when the environmental illuminance EI_value of the work zone WR0 falls within the third illumination range EI_0, the work zone WR0 is classified as a work zone where the positioning accuracy is at a "failed positioning" level. In an embodiment, only when the environmental illuminance EI_value of the work zone WR0 falls within the third illumination range EI_0 and the mean error PME is greater than the first error threshold TH_LowPre will the work zone WR0 be classified as a work zone where the positioning accuracy is at a "failed positioning" level.

In another example, when environmental illuminance EI_value is less than an illumination lower limit MinEI, this indicates that the environmental illuminance of the field 2000 is insufficient, the environmental image E-img generated by the first camera 100 is invalid, the environmental positioning information E-pos of all regions of the virtual floor vf1 provided by the first camera 100 are invalid, and all regions of the virtual floor vf1 are classified as the work zone WR0 where the positioning accuracy is at a "failed positioning" level.

On the other hand, the work zone WR1 and the work zone WR2 both are within the shooting range of the first camera 100. Within the work zone WR1, the mean error PME of marking mapping of each marking position is less than the first error threshold TH_LowPre and greater than the second error threshold TH_HighPre, this indicates that the mean error PME is tolerable, the positioning accuracy of the work zone WR1 is at a "low positioning accuracy" level, and the work zone WR1 may be classified as a work zone where the positioning accuracy is at a "low positioning accuracy" level. If the environmental illuminance EI_value is introduced as a sub-condition of, the environmental illuminance EI_value of the work zone WR1 needs to fall within the first illumination range EI_1.

Moreover, when the mean error PME of marking mapping of each marking position in the work zone WR2 is less than the second error threshold TH_HighPre, this indicates that the positioning accuracy is higher, the positioning accuracy of the work zone WR2 is at a "high positioning accuracy" level and the positioning accuracy of the work zone WR2 may be classified as a "high positioning accuracy" level. If the environmental illuminance EI_value is introduced as a sub-condition, the environmental illuminance EI_value of the work zone WR2 needs to fall within the second illumination range EI_2.

The mechanism of dividing the virtual floor vf1 into the work zones WR0, WR1 and WR2, according to the mean error PME of marking mapping and the environmental illuminance EI_value, is summarized in Table 1 below:

TABLE 1

| Work zone | Levels of positioning accuracy | Condition of judgement related to mean error PME | Condition of judgement related to environmental illuminance EI_value |
|---|---|---|---|
| WR2 | High | PME < TH_HighPre | EI_value ∈ EI_2 |
| WR1 | Low | TH_HighPre < PME < TH_LowPre | EI_value ∈ EI_1 |
| WR0 | Failed | TH_LowPre < PME<br>N/A | EI_value ∈ EI_0<br>EI_value < MinEI |

Based on the positioning accuracy and environmental illuminance EI_value of each marking position of the virtual floor vf1, the computing device 150 divides the virtual floor vf1 into work zone WR0, WR1 and WR2 where the positioning accuracy is at a "failed positioning" level, "low positioning accuracy" level and "high positioning accuracy" level, respectively. Thus, the user of the operation target 700 may obtain in advance the positioning ability that the first camera 100 may provide on the virtual floor vf1, so that the user may control the operation target 700 to selectively operate in the work zone WR0, WR1 and/or WR2 according to the needs of the task. In an embodiment, the second error threshold TH_HighPre is less than the first error threshold TH_LowPre. In an embodiment, the first illumination range EI_1, the second illumination range EI_2, and the third illumination range EI_0 may have different ranges. For instance, the first illumination range EI_1 is less than the second illumination range EI_2, and the second illumination range EI_2 is less than the third illumination range EI_0. In an embodiment, the condition of judgement may the environmental illuminance of each work zone may be identical. For instance, when the environmental illuminance EI_value is greater than the illumination lower limit MinEI, it may be determined that the illumination in the corresponding work zone is sufficient, and the level of positioning accuracy may be determined according to the mean error PME.

Likewise, based on the positioning accuracy and/or environmental illuminance EI_value of the first camera 100, the virtual floor corresponding to other height is also divided into different work zones having levels of positioning accuracy. For instance, the virtual floor vf2 corresponding to height h2 is divided into work zones WR0(2), WR1(2) and WR2(2) where the positioning accuracy is at a "failed positioning" level, "low positioning accuracy" level and "high positioning accuracy" level, respectively (not illustrated in FIGS. 4A and 4B). Since the height of the virtual floor vf2 is different from that of the virtual floor vf1, the work zones WR0(2), WR1(2) and WR2(2) of the virtual floor vf2 may be identical to or different from the work zone WR0, WR1 and WR2 of the virtual floor vf1.

When the shooting range of the first camera 100 alone cannot effectively cover most of the virtual floor vf1, additional cameras may be used to shoot the field 2000, then the environmental images obtained by each camera may be stitched to create a work zone which is continuous and has a wider range.

Figure 5A:
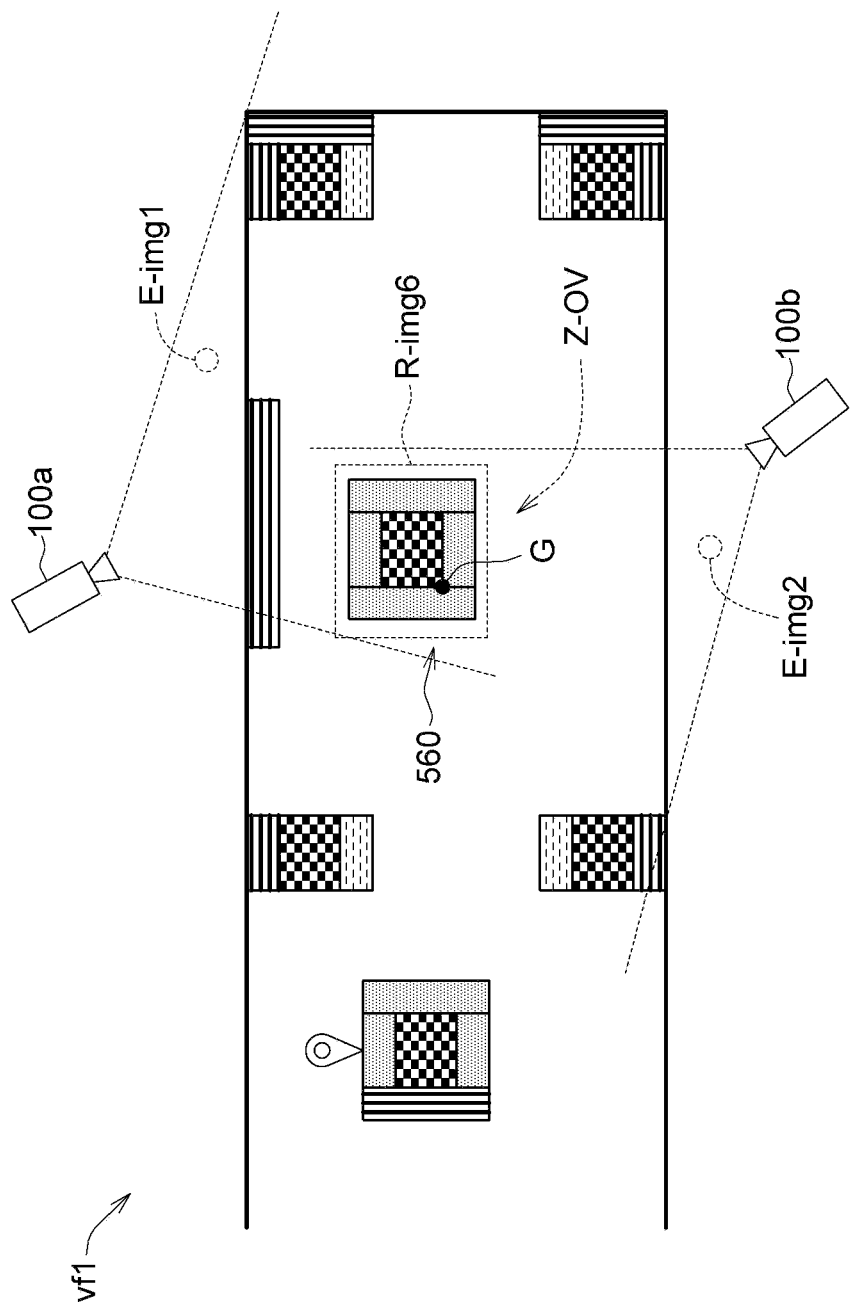
FIGS. 5A and 5B are schematic diagrams of stitching the environmental images generated by several cameras.
Figure 5B:
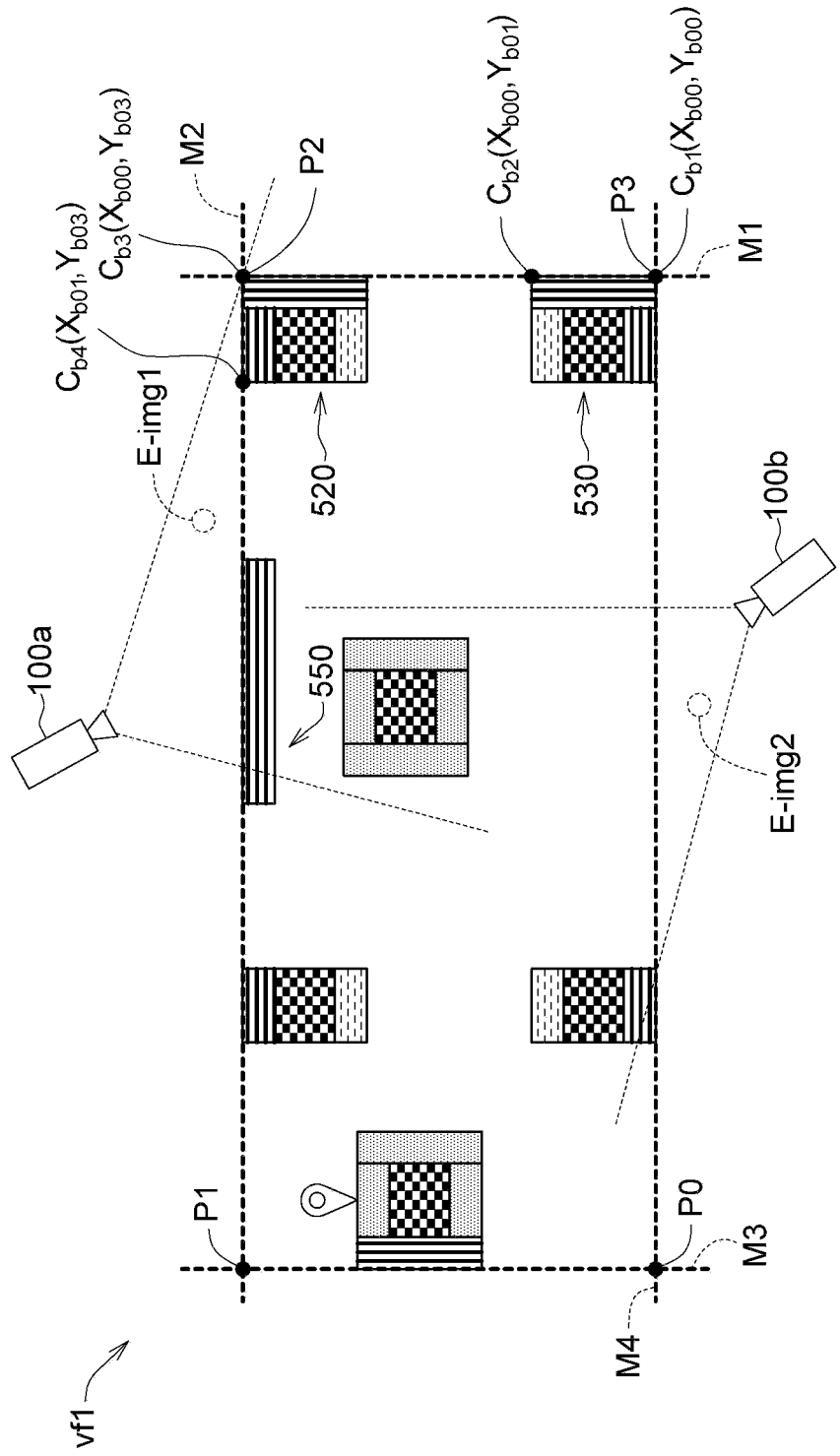

FIGS. 5A and 5B are schematic diagrams of stitching the environmental images generated by several cameras. The descriptions are exemplified by two camera (the first camera 100a and the second camera 100b) and a virtual floor vf1. Referring to FIG. 5A, which is a schematic diagram of stitching the environmental images generated by and the first camera 100a and the second camera 100b. The first camera 100a generates an environmental image E-img1, the second camera 100b generates an environmental image E-img2. When the environmental image E-img1 alone or the environmental image E-img2 alone cannot cover the entire virtual floor vf1 or provide a positioning accuracy sufficient for the entire range (for instance, the positioning accuracy is at a "high positioning accuracy" level or above "low positioning accuracy" level), the environmental image E-img1 may be stitched to the environmental image E-img2.

In an embodiment, the environmental image E-img1 and the environmental image E-img2 have an overlapped area Z-OV, which is used as a "stitched region". The marking object in the overlapped area Z-OV may be used to assist stitching. For instance, the overlapped area Z-OV has a marking object 560, and the marking image R-img6 of the marking object 560 is used to assist stitching. The marking position G of the marking object 560 and the corner point of the grid pattern of the marking object 560 may be used as a confidence point. Then, the information of coordinate position of each point in the work zone generated from stitching (referred as "extended work zone") may be calculated according to the coordinate position of the confidence point. In an example, in the overlapped area Z-OV, the positioning information provided by the camera 100a with a higher positioning accuracy is used. For instance, if the positioning information provided by the first camera 100a with a higher positioning accuracy is used in the overlapped area Z-OV, then the positioning information provided by the first camera 100a continues to be used in subsequent positioning calculation of the overlapped area Z-OV and the extended work zone generated from stitching.

The features in the marking image R-img6 of the marking object 560 in the overlapped area Z-OV may be analyzed using the feature comparison algorithm (for instance, speed up robust features (SURF) algorithm), so that the environmental image E-img1 and the environmental image E-img2 may be stitched according to the analyzed features. The SURF algorithm may detect the rotation of an image to align the rotation angle of the environmental image E-img1 with the environmental image E-img2. In other examples, the environmental image E-img1 and the environmental image E-img2 may be stitched using a Harris corner detector, a Hessian affine region detector, or the scale invariant feature transform (SIFT) algorithm.

Next, referring to FIG. 5B, which is a schematic diagram of marking the boundary lines of the environmental image E-img1 and the environmental image E-img2. The boundaries of the work zone of the virtual floor vf1 are marked according to the boundary information of the marking object. As indicated in the environmental image E-img1, the lateral boundary of the bar pattern on the right hand side of the marking object 530 has confidence points $C_{b1}$ and $C_{b2}$, wherein the position of the positioning point $C_{b2}$ is an upward translation of the confidence point $C_{b1}$. The confidence points $C_{b1}$ and $C_{b2}$ are used as "boundary positioning points", and a boundary line M1 may be obtained from the extension line of the confidence points $C_{b1}$ and $C_{b2}$. Moreover, based on the coordinate position ($X_{b00}$, $Y_{b00}$) of the confidence point $C_{b1}$ and the coordinate position ($X_{b00}$, $Y_{b01}$) of the positioning point $C_{b2}$, the boundary line M1 may be calculated according to an equation which may be expressed as: $a_1x+b_1y+c_1=0$. The work zone where the operation target 700 operates is to the left of the boundary line M1 (the equation may be expressed as: $a_1x+b_1y+c_1<0$).

Likewise, in the environmental image E-img1, the top boundary of a bar pattern on the top of another marking object 520 has confidence points $C_{b3}$ and $C_{b4}$. The confidence points $C_{b3}$ and $C_{b4}$ are used as "boundary positioning points". Based on the coordinate position ($X_{b00}$, $Y_{b03}$) of the confidence point $C_{b3}$ and the coordinate position ($X_{b01}$, $Y_{b03}$) of the positioning point $C_{b4}$, the boundary line M2 may be calculated according to an equation which may be expressed as: $a_2x+b_2y+c_2=0$. The work zone where the operation target 700 operates is the underneath of the boundary line M2 (the equation may be expressed as: $a_2x+b_2y+c_2<0$).

According to the above calculation, the boundary lines M1, M2, M3 and M4, and their intersection points P0, P1, P2 and P3 may be obtained. The boundary lines M1~M4 and the intersection points P0~P3 may define a polygon, which is an extended work zone generated after the environmental image E-img1 and the environmental image E-img2 are stitched together, also refers to a "valid work zone" where the operation target 700 may operate on the virtual floor vf1. The region outside the polygon is an "invalid region". The positioning information in the invalid region is not calculated, so that the computing volume of the computing device 150 may be reduced.

After the work zones are stitched and boundary lines are defined, the "vector work zone" of the operation target 700 of the virtual floor vf1 is subsequently generated. The vector work zone provides a consistent coordinate system to simplify the complexity in the description of the work zone model. In an example, through the term frequency-inverse document frequency (tf-idf) model, the work zone defined by the boundary lines M1~M4 and the intersection points P0~P3 is converted to a three-dimensional (3D) vector work zone, the vector work zone has a 3D coordinate system on the vector space. In another exemplary example, through the Bursa-Wolf model or the "OGC indoor GML standard" specified by the Open Geospatial Consortium, the coordinate position of the vector work zone of the 3D Cartesian coordinate system is converted into the data format of the GNSS information.

The embodiments of FIGS. 5A and 5B illustrate how the work zones are stitched to form the virtual floor vf1 and how the boundary lines M1~M4 of the work zones are defined. The work zones of a different virtual floor, such as the virtual floor vf2, may be defined in similar way. The ranges and the positions of the boundary lines of the work zones of the virtual floor vf2 may be different from that of the virtual floor vf1. When a valid work zone of the virtual floor vf2 is provided with a GNSS information, the coordinate positions of other positioning points in the work zone may be derived from the GNSS information. When the valid work zone of the virtual floor vf2 lacks the GNSS information, the positioning point of the virtual floor corresponding to other height (such as the lowest height), e.g., the virtual floor vf1 corresponding to height h1, with highest positioning accuracy, may be used as the original point. The coordinate system of the virtual floor corresponding to other height, e.g., the virtual floor vf1 corresponding to height h1, may be used. In an embodiment, the direction in which the lens of the first camera 100b or the second camera 100b is projected to the virtual floor vf2 is used as the X axis of the 3D coordinate system of vector work zone, and the direction perpendicular to the virtual floor vf2 is used as the Z axis of the 3D coordinate system.

The embodiments of FIGS. 1A~5B explain that, through the cooperation of one or several monocular environmental camera (such as the first camera 100a and/or the second camera 100b) and the computing device 150, an environmental positioning information E-pos for valid work zones of different virtual floors (such as virtual floors vf1 and vf2) may be generated, and each virtual floor may be divided into different work zones according to the environmental positioning information E-pos. In an embodiment, when the operation target 700 operates on different virtual floors, the operation target 700 may be more accurately positioned, by fusing the sensing information of the operation target 700 to the environmental positioning information E-pos already generated. Detailed descriptions are disclosed below.

Figure 6A:
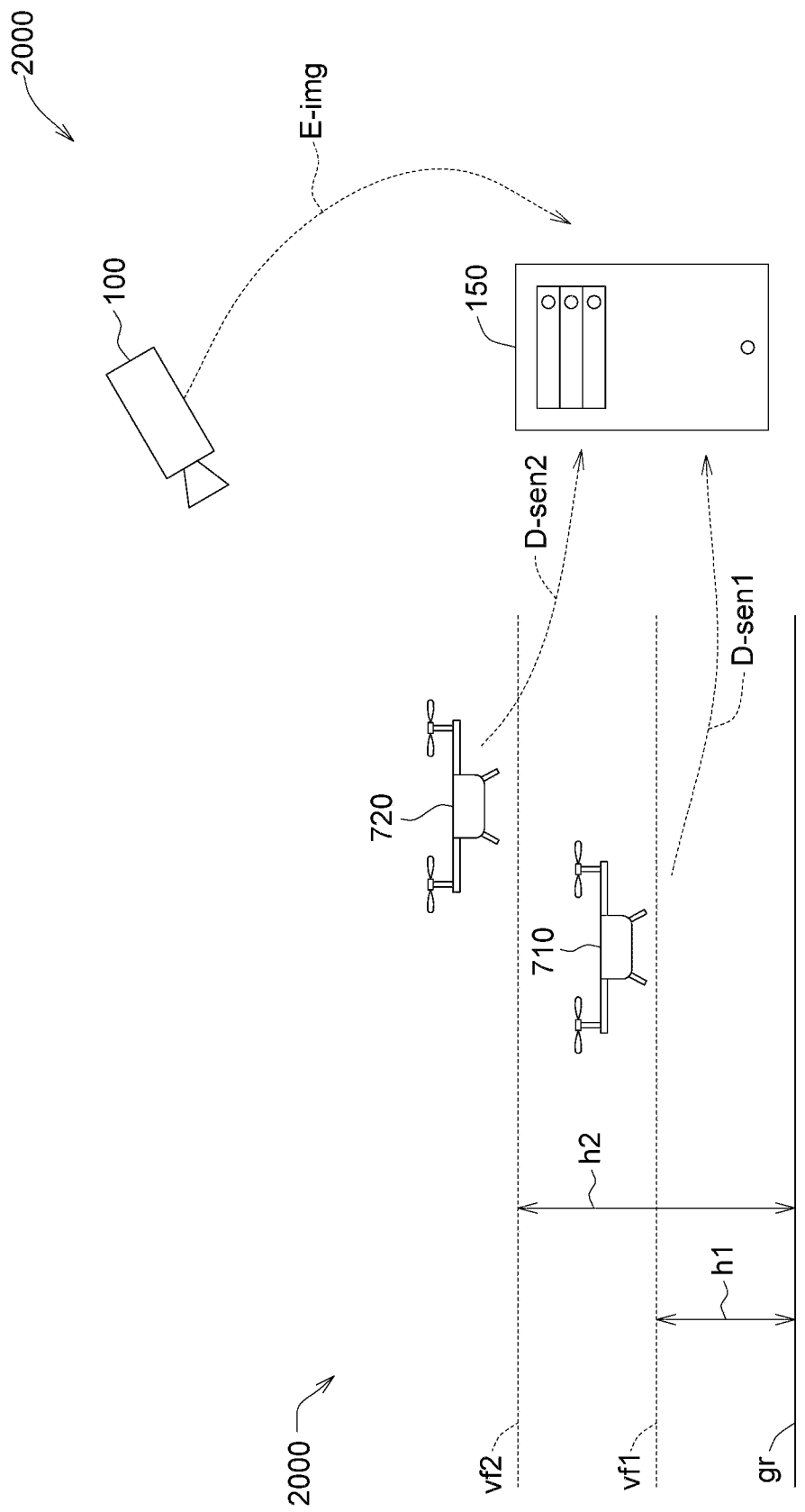
FIG. 6A, which is a schematic diagram of more accurately positioning the operation target by fusing the sensing information of the operation target to the environmental positioning information E-pos.

Referring to FIG. 6A, which is a schematic diagram of more accurately positioning the operation target by fusing the sensing information of the operation target to the environmental positioning information E-pos. The computation of fusing the environmental positioning information E-pos to the sensing information of the operation target is referred as adaptive localization calculation and compensation (AL-CCM). The first camera 100 generates an environmental image E-img of the virtual floors vf1 and vf2. The computing device 150 performs relevant marking mapping of the environmental image E-img to generate an environmental positioning information E-pos, and fuse the sensing information of different operation targets 710 and 720 through ALCCM. That is, different operation targets 710 and 720 may share the same environmental positioning information E-pos. Since that, the positioning system 1000 according to an embodiment of the present disclosure does not need to provide different environmental positioning information to different operation targets 710 and 720, therefore, computing resources may be reduced.

In the embodiment of FIG. 6A, the sensor of the operation target 710 includes a range finder or a Lidar and has a function of height sensing. The sensing information D-sen1 provided by the operation target 710 contains a height information, which reflects the actual height h1 of the operation target 710 (or closer to height h1) and may be used to obtain the virtual floor vf1 at which the operation target 710 currently operates. The sensing information D-sen1 of the operation target 710 is transmitted to the computing device 150. The computing device 150 obtains the virtual floor vf1 corresponding to the actual height h1, at which the operation target 710 currently operates, according to the height information contained in the sensing information D-sen1. Then, the computing device 150 fuses the environmental positioning information E-pos corresponding to the virtual floor vf1 to the sensing information D-sen1, so as to more accurately position the operation target 700, and/or to more accurately navigate the flight route of the operation target 700.

In another example, the computing device 150 may set a predefined height h_def for the operation target 710. When the sensing information D-sen1 of the operation target 710 is temporarily unavailable (for instance, at the initial stage of the ALCCM algorithm), the computing device 150 provides the environmental positioning information E-pos of the virtual floor corresponding to the predefined height h_def to the operation target 710. Alternatively, when the sensor of the operation target 710 does not have the function of height sensing, the computing device 150 provides the environmental positioning information E-pos of the virtual floor corresponding to the predefined height h_def to the operation target 710.

Likewise, for the operation target 720, the sensing information D-sen2 of the operation target 720 is transmitted to the computing device 150. The computing device 150 obtains that, the operation target 710 currently operates on the virtual floor vf2 corresponding to the actual height h2, according to the height information contained in the sensing information D-sen2. Then, the computing device 150 fuses the environmental positioning information E-pos (which corresponds to the virtual floor vf2) to the sensing information D-sen2, so as to more accurately position and/or navigate the operation target 720.

Figure 6B:
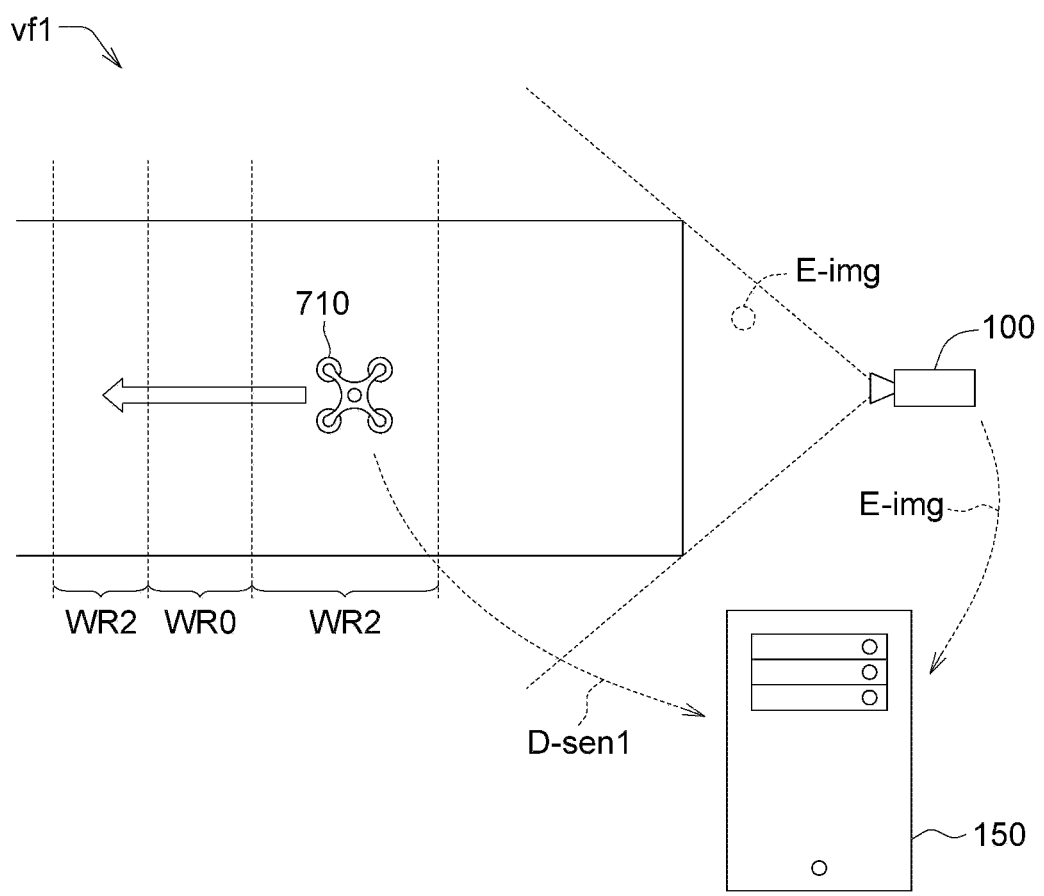
FIG. 6B, which is a schematic diagram of performing inertial navigation on the operation target 710 by fusing the inertial measurement unit information contained in the sensing information D-sen1 of the operation target 710 to the environmental positioning information E-pos.

Referring to FIG. 6B, which is a schematic diagram of performing inertial navigation on the operation target 710 by fusing the inertial measurement unit information contained in the sensing information D-sen1 of the operation target 710 to the environmental positioning information E-pos. In the embodiment of FIG. 6B, the sensor of the operation target 710 includes an inertial measurement unit, such as an inertial sensor (IMU) having a function of inertial sensing. The sensing information D-sen1 provided by the operation target 710 includes an inertial measurement unit information, which reflects a direction of inertial motion of the operation target 710. After the sensing information D-sen1 is transmitted to the computing device 150, the computing device 150 performs inertial navigation on the operation target 710 according to the inertial measurement unit information contained in the sensing information D-sen1.

In an example, the virtual floor vf1, on which the operation target 710 operates, is divided into a plurality of valid work zones. When valid work zones are not continuous (that is, there is a non-continuous portion between the valid work zones), the computing device 150 performs inertial navigation for the operation target 710 to cross over the non-continuous portion between the valid work zones, according to the inertial measurement unit information. For instance, the virtual floor vf1 is divided into two work zones WR2 with a positioning accuracy of "high positioning accuracy" level, and a work zone WR0 with a positioning accuracy of "failed positioning" level. For the operation target 710, the work zones WR2 of "high positioning accuracy" level are valid work zones, and the work zone WR0 of "failed positioning" level is an invalid work zone. The two work zones WR2 of the virtual floor vf1 are not continuous and are separated by a non-continuous portion (i.e., the non-continuous portion is the work zone WR0 of "failed positioning" level).

When the operation target 710 actually operates in the two valid work zone WR2, the computing device 150 may navigate the operation target 710 according to the environmental positioning information E-pos generated in advance. The computing device 150 receives the sensing information D-sen1 of the operation target 710 to obtain the inertial measurement unit information. When the operation target 710 crosses over the invalid work zone WR0, the computing device 150 may navigate the operation target 710 according to the inertial measurement unit information, so that the operation target 710 may cross over the work zone WR0 of "failed positioning" level, according to a navigation route.

Figure 7A:
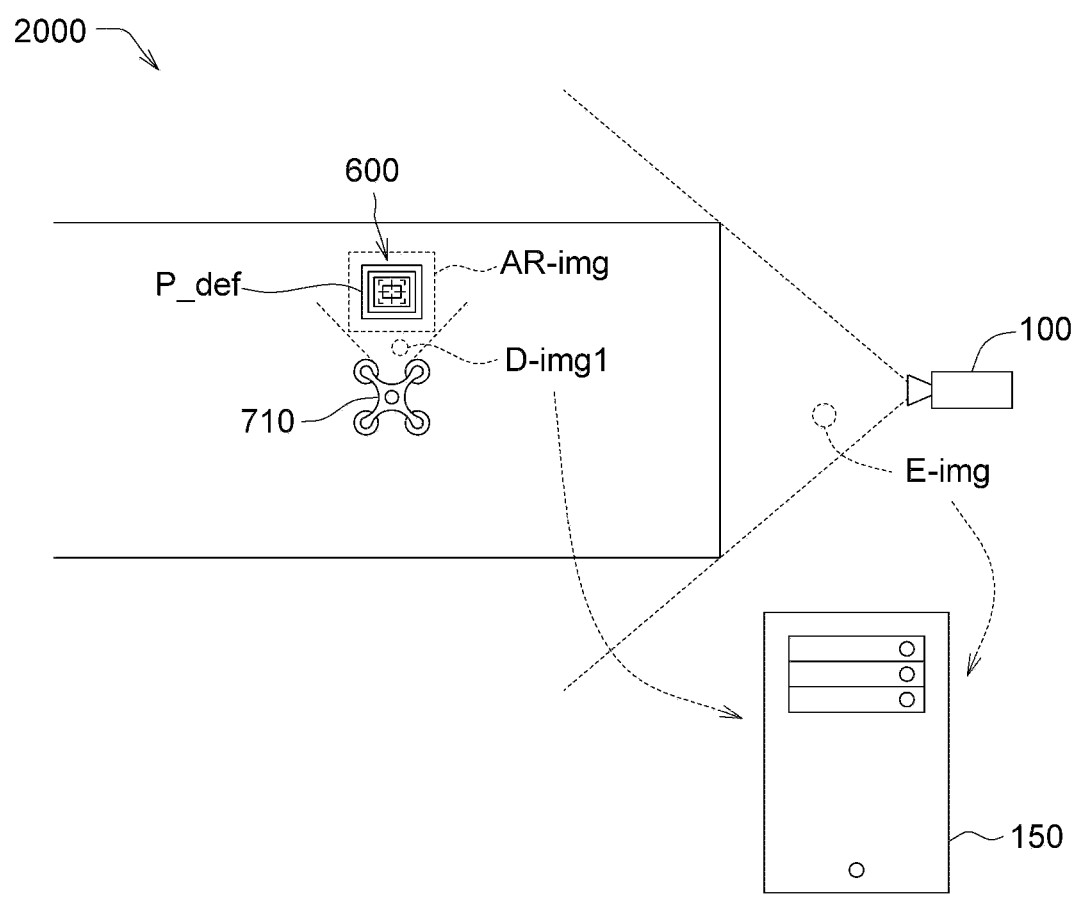
FIGS. 7A and 7B are schematic diagrams of performing "dotting and positioning" for the operation target 710 by fusing the image information D-img1 contained in the sensing information D-sen1 of the operation target 710 to the environmental positioning information E-pos.
Figure 7B:
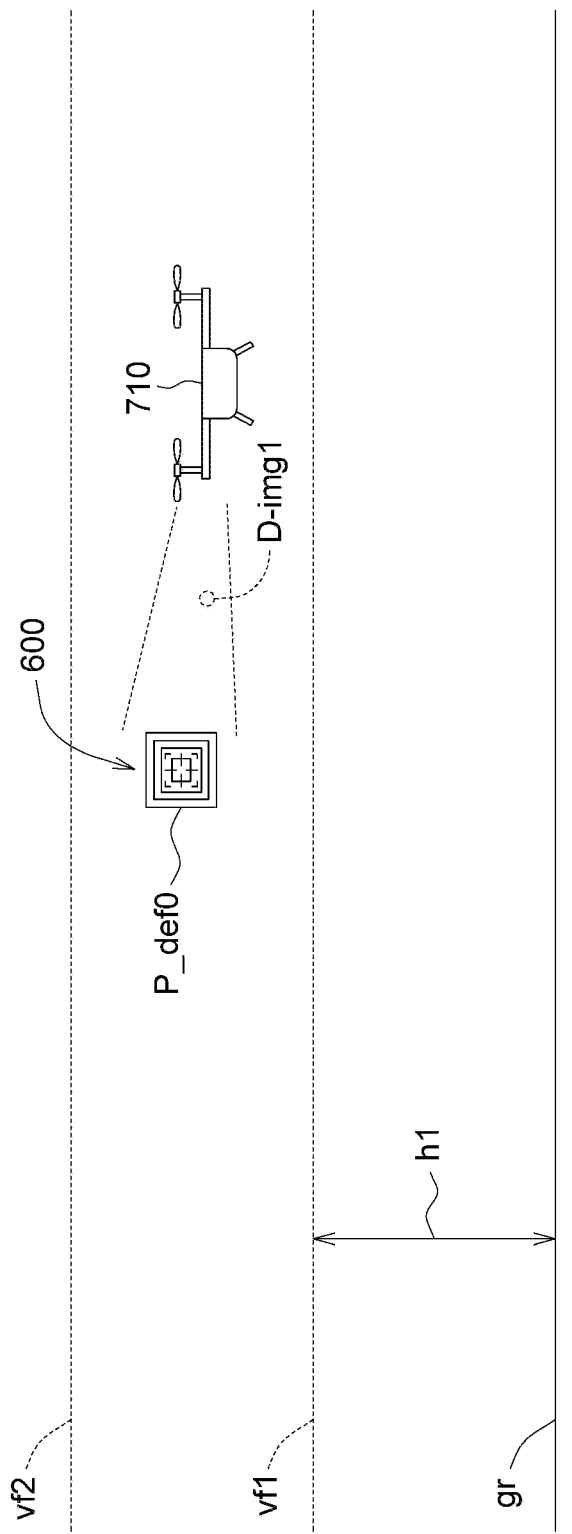

FIGS. 7A and 7B are schematic diagrams of performing "dotting and positioning" for the operation target 710 by fusing the image information D-img1 contained in the sensing information D-sen1 of the operation target 710 to the environmental positioning information E-pos. In the embodiments of FIGS. 7A and 7B, the sensor of the operation target 710 includes a camera and therefore has a function of image capturing. The sensing information D-sen1 provided by the operation target 710 contains the image information D-img1. The scenery of the field 2000 corresponding to the actual position of the operation target 710 may be presented in the image information D-img1. That is, the scenery shot by the sensor of the operation target 710 at the actual position in the field 2000, is presented in the image information D-img1.

Referring to FIGS. 7A, an auxiliary marking object 600 is placed at the predefined target position P_def of the field 2000. The first camera 100 shoots the auxiliary marking object 600 to generate an auxiliary marking image AR-img, which is contained in the environmental image E-img generated by the first camera 100. The auxiliary marking image AR-img presents a predefined pixel range and a predefined outline profile of the auxiliary marking object 600.

On the other hand, when the operation target 710 operates in the field 2000, the camera of the sensor of the operation target 710 also shoots the auxiliary marking object 600 to generate an image information D-img1. That is, at the actual position in the field 2000 where the operation target 710 operates, the auxiliary marking object 600 shot by the sensor of the operation target 710 is presented in the image information D-img1. During the operation of the operation target 710, the height, position, angle and gesture of the operation target 710 are adjusted, so that the camera of the operation target 710 may shoot the auxiliary marking object 600 at different angles, and present the auxiliary marking object 600 in the image information D-img1 according to different angles.

Moreover, the computing device 150 (or the processor disposed in the operation target 710) analyzes and compares the auxiliary marking image AR-img with the auxiliary marking object 600 presented in the image information D-img1 to determine whether the auxiliary marking object 600 presented in the image information D-img1 matches the predefined pixel range and the predefined outline profile of the auxiliary marking image AR-img or not. When the auxiliary marking object 600 presented in the image information D-img1 matches the predefined pixel range and predefined outline profile, this indicates that the operation target 710 is accurately navigated to the predefined target position P_def (that is, the actual position of the operation target 710 is close to the predefined target position P_def), and the operation target 710 is adjusted to the predefined angle and gesture.

As disclosed above, the computing device 150 accurately navigates the operation target 710 to the predefined target position P_def by fusing the image information D-img1 of the sensing information D-sen1 to the environmental positioning information E-pos, and such operation is referred as "dotting and positioning" for the operation target 710.

Referring to FIG. 7B. The "dotting and positioning" operation for the operation target 710 may be performed in a vertical direction. The auxiliary marking object 600 is disposed at a predefined target position P_def0 on the wall panel in the field 2000, wherein the wall panel is perpendicular to the horizontal plane of the virtual floors vf1 and vf2. The predefined target position P_def0 is located between the virtual floors vf1 and vf2 (that is, a region crossing from the virtual floor vf1 to the virtual floor vf2).

When the operation target 710 operates at a height greater than height h1 and gets away from the virtual floor vf1, it is determined that, whether the auxiliary marking object 600 presented in the image information D-img1 provided by the operation target 710 matches the predefined pixel range and predefined outline profile of the auxiliary marking object 600, so that the operation target 710 may be accurately navigated to the predefined target position P_def0 in the vertical direction. Thus, the "dotting and positioning" function is performed in the region crossing from the virtual floor vf1 to the virtual floor vf2 and enables the operation target 710 to be smoothly switched between the virtual floor vf1 and the virtual floor vf2. That is, the "dotting and positioning" function is performed by fusing the image information D-img1 of the sensing information D-sen1 to the environmental positioning information E-pos, so that the operation target 710 may be guided to switch to a new virtual floor.

In another example, when the GNSS information may be connected to the work zone, and the sensor of the operation target 710 has a navigation function (such as an e-compass function), the GNSS information may be combined with the navigation information of the sensing information D-sen1 of the operation target 710. On the other hand, when the GNSS information cannot be connected to the work zone, the confident point of the virtual floor (such as virtual floor vf1) corresponding to other height (such as the lowest height), which is closest to the X axis of the (x,y) coordinate system, may be used as the original point. Furthermore, the coordinate system of the virtual floor corresponding to other height (for instance, the virtual floor vf1 corresponding to height h1) may be used. In this manner, coordinate position of other positioning points may be calculated, extendedly.

To summarize, in each of the embodiments of FIGS. 6A, 6B, 7A, and 7B, the environmental positioning information E-pos is fused to the sensing information of the operation target D-sen1, so that the operation target may be more accurately positioned or navigated. The positioning system 1000 of FIGS. 6A, 6B, 7A and 7B is used to provide an environmental positioning information E-pos of the field 2000 utilizing monocular vision, wherein the field 2000 has a plurality of virtual floors vf1, vf2, . . . , and so on. The virtual floors correspond to different heights h1, h2, . . . , and so on. The positioning system 1000 includes a computing device 150 configured to generate an environmental positioning information E-pos according to the environmental image E-img, wherein the environmental positioning information E-pos corresponds to the virtual floors. The operation target 710 operates on one of the virtual floors (such as virtual floor vf1). The operation target 710 provides a sensing information D-sen1, and the computing device 150 is further configured to fuse the sensing information D-sen1 to the environmental positioning information E-pos.

In the embodiment of FIG. 6A, the sensing information D-sen1 provided by the operation target 710 contains a height information, which reflects the actual height of the operation target 710 (such as height h1), the operation target 710 operates on the virtual floor corresponding to or close to the actual height (such as the virtual floor vf1 corresponding to height h1). The computing device 150 is further configured to analyze the height information contained in the sensing information D-sen1, select the virtual floor vf1 corresponding to or close to the actual height according to the height information, and fuse the height information to the environmental positioning information E-pos corresponding to the virtual floor vf1.

In the embodiment of FIG. 6B, the sensing information D-sen1 provided by the operation target 710 contains an inertial measurement unit information, which reflects a direction of inertial motion of the operation target 710. The virtual floor vf1 is divided into a plurality of valid work zones (such as two work zones WR2 with the positioning accuracy of "high positioning accuracy" level), and there is a non-continuous portion, such as the work zone WR0 of "failed positioning" level, between the valid work zones WR2. The computing device 150 is further configured to analyze the inertial measurement unit information contained in the sensing information D-sen1, determine the direction of inertial motion of the operation target 710 according to the inertial measurement unit information, and fuse the inertial measurement unit information to the environmental positioning information E-pos, so that the operation target 710 may be navigated to cross over the non-continuous portion.

In the embodiments of FIGS. 7A and 7B, the sensing information D-sen1 provided by the operation target 710 contains an image information D-img1, and the predefined target position P_def of the field 2000 has an auxiliary marking object 600, which is presented in the image information D-img1. The computing device 150 is further configured to analyze the image information D-img1 contained in the sensing information D-sen1, and determine whether the auxiliary marking object 600 matches the predefined pixel range and predefined outline profile according to the image information D-img1. For instance, the environmental image E-img generated by the first camera 100 contains an auxiliary marking image AR-img of the auxiliary marking object 600, and the predefined pixel range and outline of the auxiliary marking object 600 are presented in the auxiliary marking image AR-img. Moreover, the image information D-img1 is fused to the environmental positioning information E-pos, so that the operation target 710 may be navigated to the predefined target position P_def.

Figure 8:
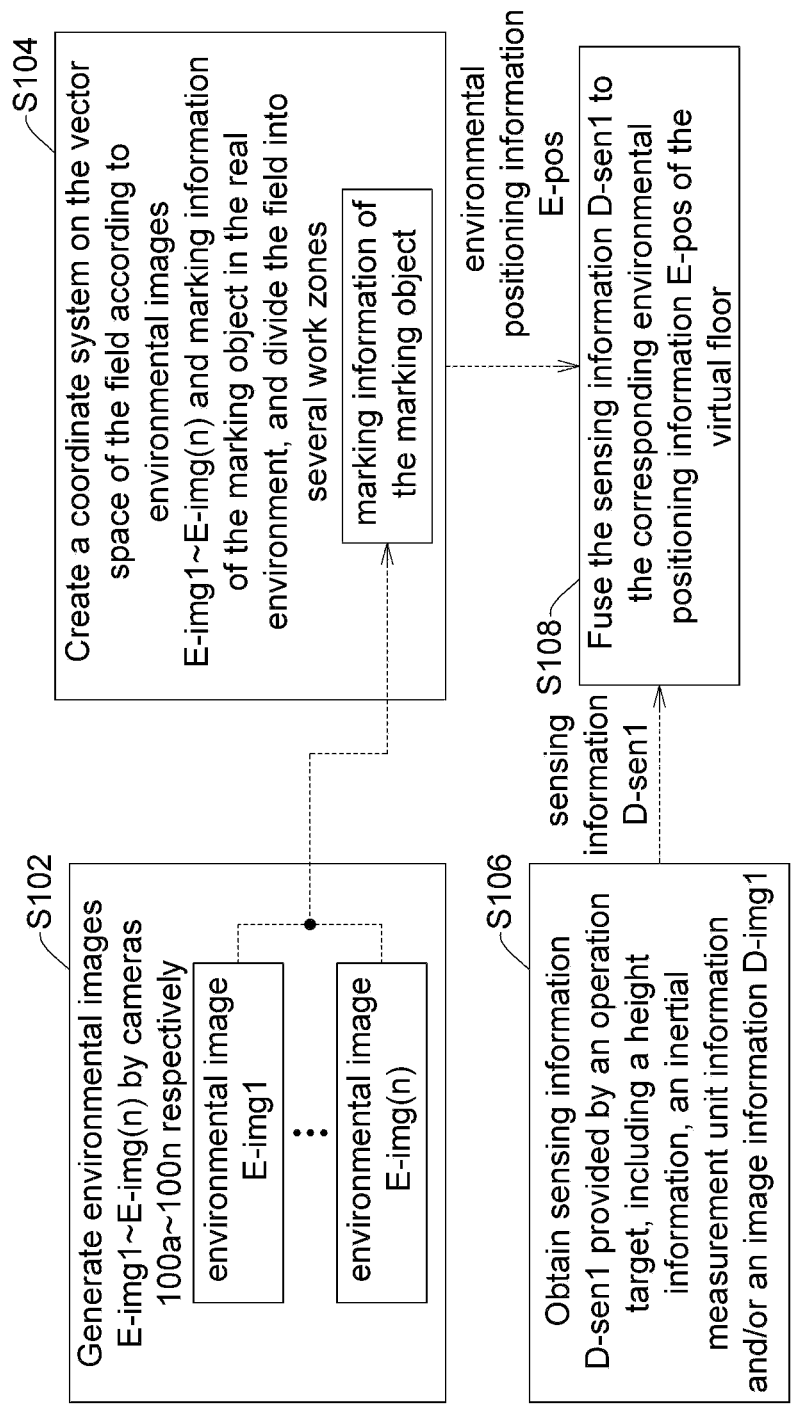
FIG. 8, which is a flowchart of a positioning method according to an embodiment of the present disclosure.

Referring to FIG. 8, which is a flowchart of a positioning method according to an embodiment of the present disclosure. The method of FIG. 8 is implemented in cooperation with the hardware elements of the positioning system 1000 of FIGS. 1A to 7B. Firstly, the method begins at step S102, an environmental image E-img of the field 2000 is generated utilizing at least one monocular environmental camera. For instance, the positioning system 1000 includes N cameras 100a~100n, which respectively generate environmental images E-img1~E-img(n) of the field 2000. A marking object is placed at different marking positions of the virtual floors corresponding to different heights of the field 2000. The cameras 100a~100n shoot the marking object to obtain a marking image R-img of the marking object at different marking positions. In an example, the marking image R-img is contained in the environmental images E-img1~E-img(n).

Then, the method proceeds to step S104, a vector space coordinate system in the field 2000 is created according to the environmental images E-img1~E-img(n) and the marking information of the marking object in the real environment, and the field 2000 is divided into several work zones. Detailed descriptions of step S104 are disclosed below. A marking mapping operation is performed on the marking object in the real environment to map the marking object to the environmental images E-img1~E-img(n), and map the positioning points (i.e., "marking positioning points") of the marking object to corresponding pixels of the marking image R-img contained in the environmental images E-img1~E-img(n), so as to obtain a mapping relationship between the positioning points of the marking object and the pixels of the marking image R-img. Furthermore, the positioning information R-pos related to the vicinity of the marking position of the marking object is obtained according to the mapping relationship of marking mapping. Then, the positioning accuracy of the positioning information R-pos is evaluated according to the error of marking information of the marking object. The marking information of the marking object contains the coordinate positions of the positioning points of a predefined pattern (such as corner points). The error of marking information includes respective error cE and mean error PME of the coordinate positions of the pixels mapped from the positioning points. Then, the field 2000 is divided into several work zones according to the positioning accuracy. Then, corresponding positioning information R-pos of each marking position is integrated as corresponding environmental positioning information E-pos of each virtual floor.

In an embodiment, the environmental positioning information E-pos is fused to the sensing information provided by the operation target 700, so that the operation target 700 may be more accurately positioned. In step S106, the sensing information D-sen1 provided by the operation target 710 is obtained, wherein the sensor of the operation target 710 may include a height sensor (such as a range finder or a Lidar), an inertial measurement unit (such as an inertial sensor), and/or a camera. The sensing information D-sen1 of the operation target 710 may contain a height information, an inertial measurement unit information, and/or an image information D-img1.

Then, the method proceeds to step S108, the sensing information D-sen1 of the operation target 710 is fused to the environmental positioning information E-pos corresponding to the virtual floor, so that the operation target 710 may be more accurately positioned. For instance, the virtual floor at a corresponding height is selected according to the height information contained in the sensing information D-sen1 of the operation target, and the operation target 710 is positioned or navigated on the virtual floor according to the environmental positioning information E-pos corresponding to the selected virtual floor. In an example, the operation target 710 is navigated to a proper virtual floor according to the environmental positioning information E-pos corresponding to the selected virtual floor. In another example, the operation target 710 is navigated to cross over the non-continuous portion between valid work zones of the field 2000 (for instance, cross over the work zone WR0 with "failed positioning" level) according to the inertial measurement unit information contained in the sensing information D-sen1 of the operation target 710. In still another example, the operation target 710 may be more accurately navigated to the predefined target position P_def according to the image information D-img1 contained in the sensing information D-sen1 of the operation target 710 (i.e., "dotting and positioning" function), so that the operation target 710 may be smoothly switched between different virtual floors.

Figure 9A:
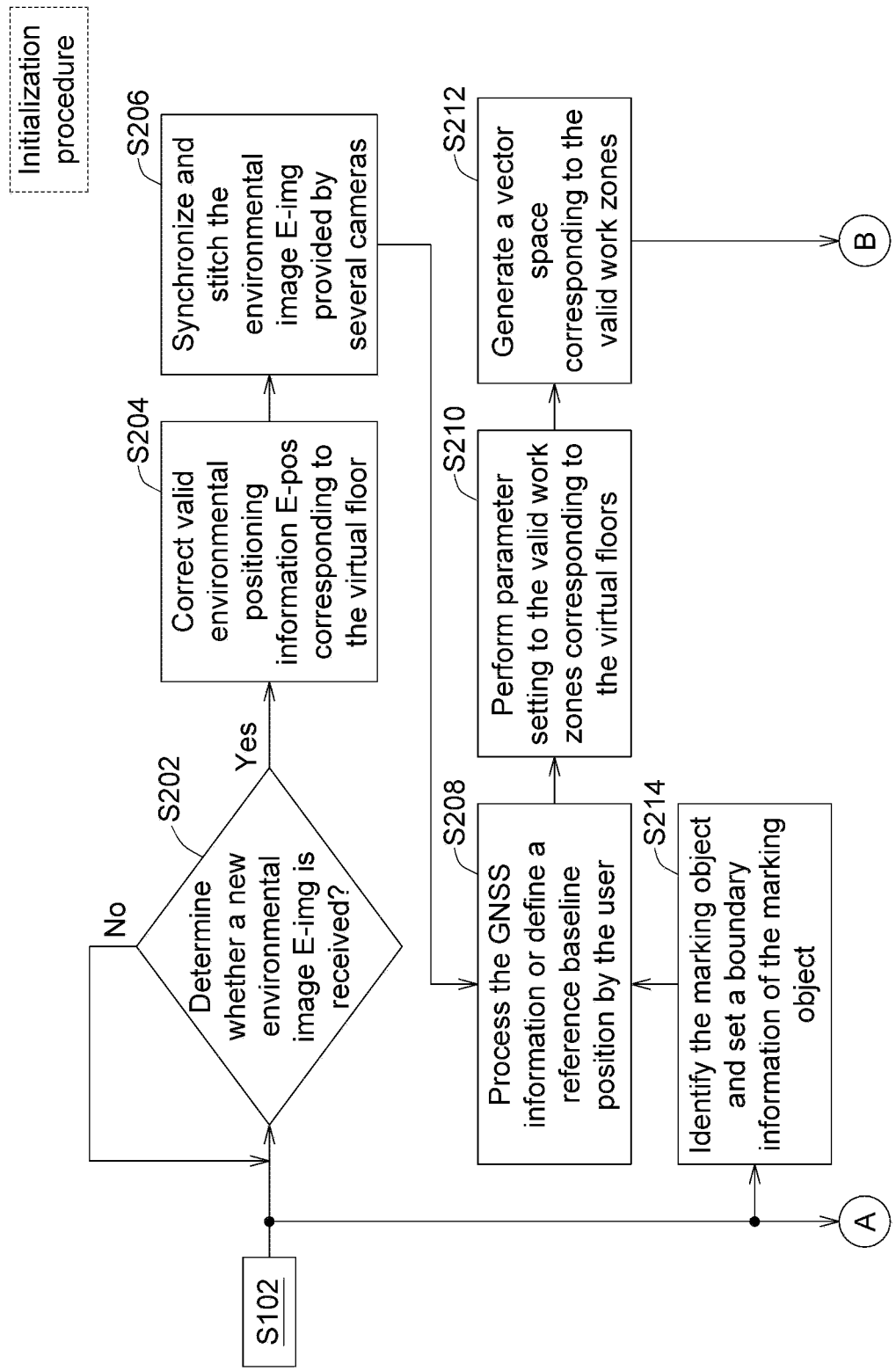
FIGS. 9A and 9B are detailed flowcharts of an embodiment of steps S104 and S108 in the positioning method of FIG. 8.
Figure 9B:
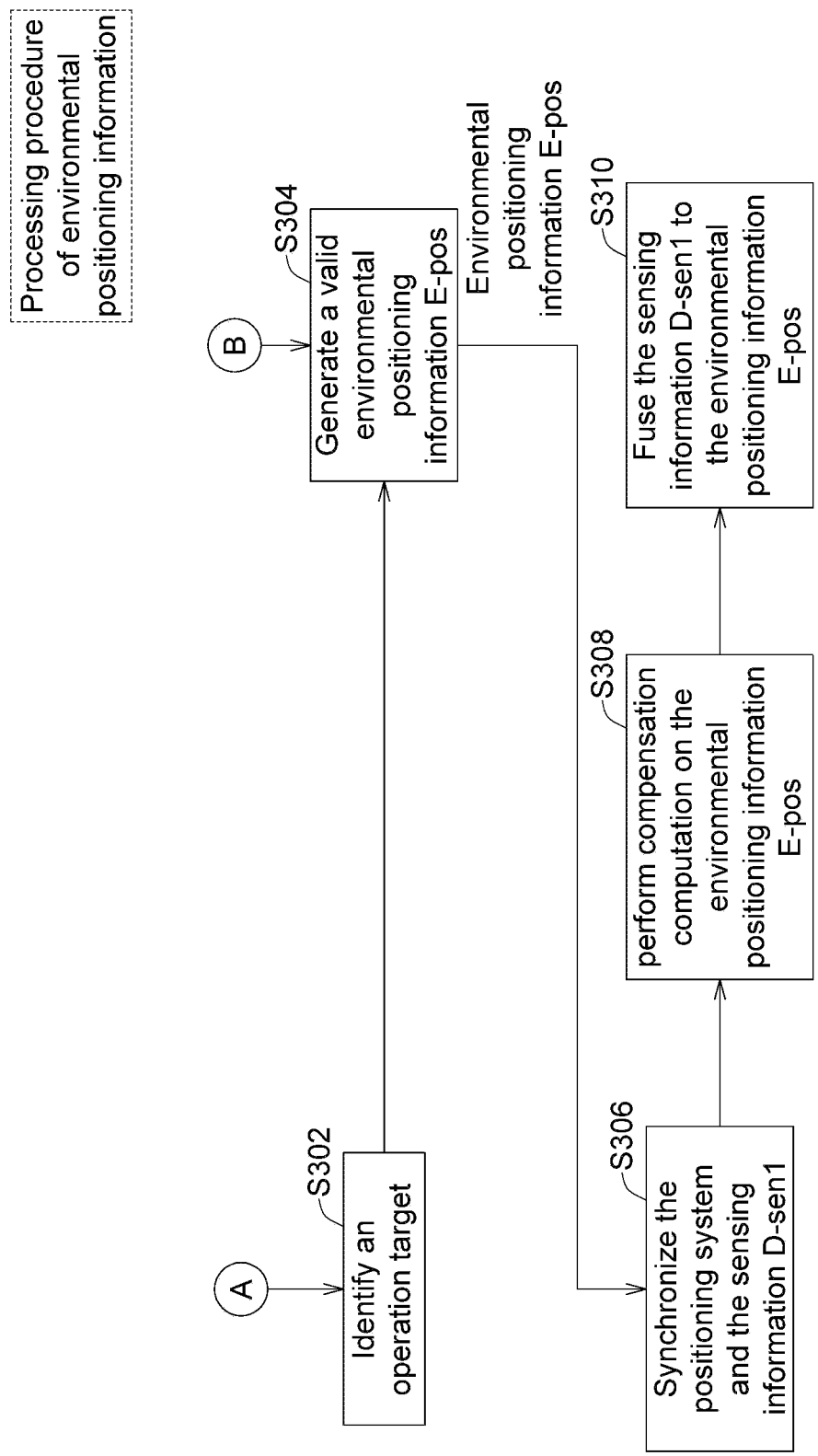

FIGS. 9A and 9B are detailed flowcharts of an embodiment of steps S104 and S108 in the positioning method of FIG. 8. Referring to FIG. 9A, each step of FIG. 9A relates to an initialization procedure. Following the step S102 of FIG. 8, the procedure proceeds to step S202 of FIG. 9A: determining whether a new environmental image E-img (including the environmental images E-img1, E-img2, . . . , and E-img(n) generated by the cameras 100a, camera 100b, . . . , and camera 100n, respectively) is received. If the determination result is "No", the method continues to wait for the reception of a new environmental image E-img. If the determination result is "Yes", the procedure proceeds to step S204: generating an environmental positioning information E-pos according to the received environmental image E-img, and correcting valid environmental positioning information E-pos corresponding to the virtual floor.

Then, the procedure proceeds to step S206: synchronizing and stitching the environmental images E-img1, E-img2, . . . , E-img(n) respectively provided by the cameras 100a, 100b, . . . , 100n. Then, the procedure proceeds to step S208: processing the GNSS information of the marking position of the environmental images E-img1, E-img2, . . . , E-img(n), or defining a reference baseline position by the user. Then, the procedure proceeds to step S210: deciding a valid work zone corresponding to the virtual floor, according to the environmental positioning information E-pos, and setting parameter for the valid work zones. Then, the procedure proceeds to step S212: converting the coordinate system of valid work zones, so as to generate a vector space 20) corresponding to the valid work zones. Then, the procedure proceeds to step S304 of FIG. 9B.

On the other hand, following the step S102 of FIG. 8, the procedure proceeds to step S214 of FIG. 9A: identifying the marking object, and setting a boundary information of the marking object. Following step S214, the procedure proceeds to step S208.

Referring to FIG. 9B, each step of FIG. 9B relates to a processing procedure of environmental positioning information E-pos. Following the step S102 of FIG. 8, the procedure begins at step S302 of FIG. 9B: identifying the operation target 710. Then, the procedure proceeds to step S304: generating a valid environmental positioning information E-pos. Step S304 may be performed after step S212 of FIG. 9A.

Then, the procedure proceeds to step S306: synchronizing the positioning system 1000 and the sensing information D-sen1 of the operation target 710. Then, the procedure proceeds to step S308: performing compensation computation for the environmental positioning information E-pos. Then, the procedure proceeds to step S310: fusing the sensing information D-sen1 of the operation target 710 to the environmental positioning information E-pos.

Figure 10:
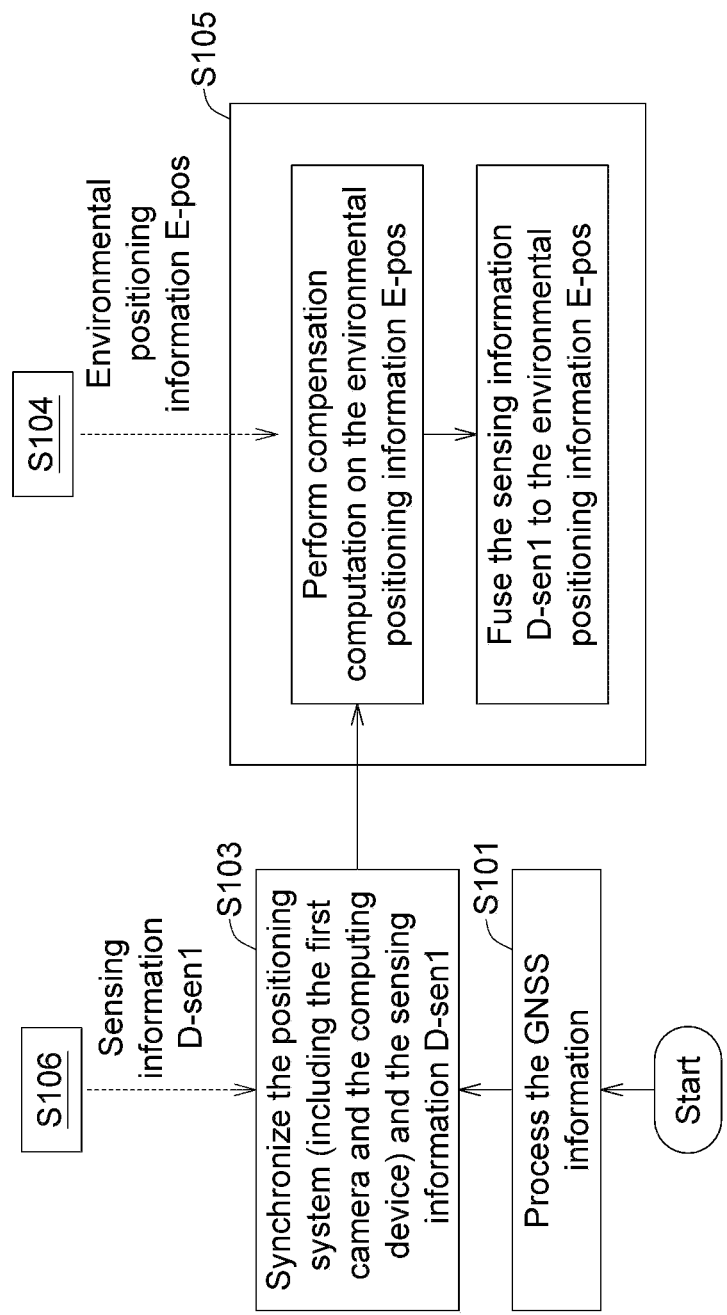
FIG. 10, which is a flowchart of another embodiment of the positioning method of FIG. 8.

Next, referring to FIG. 10, which is a flowchart of another embodiment of the positioning method of FIG. 8. Firstly, the method begins at step S101, a GNSS information is received by the positioning system 1000. Then, the procedure proceeds to step S103, the positioning system 1000 and the sensing information D-sen1 are synchronized according to the GNSS information. The positioning system 1000 includes a computing device 150, a first camera 100a, a second camera 100b, and so on. The sensing information D-sen1 is generated in step S106 of FIG. 8, and such sensing information D-sen1 is provided by the sensor of the operation target 710.

Then, the method proceeds to step S105, the environmental positioning information E-pos is performed with compensation computation. The environmental positioning information E-pos is generated in step S104 of FIG. 8. Details of step S105 are similar to those of step S108 of FIG. 8, which include: performing compensation computation for the environmental positioning information E-pos, and fusing the sensing information D-sen1 to the environmental positioning information E-pos.

In an embodiment, a positioning system is configured to provide an environmental positioning information of a field, wherein the field has a plurality of virtual floors corresponding to different heights; the positioning system includes a computing device. The computing device is configured to generate an environmental positioning information according to an environmental image of the field; the environmental positioning information corresponds to the virtual floors, wherein, an operation target operates on one of the virtual floors; the operation target provides a sensing information; the computing device is further configured to fuse the sensing information to the environmental positioning information.

In an embodiment, the sensing information provided by the operation target includes a height information, which reflects an actual height of the operation target, and the operation target operates on a virtual floor corresponding to the actual height.

In an embodiment, the computing device is further configured to analyze the height information contained in the sensing information, select the virtual floor corresponding to the actual height according to the height information, and fuse the height information to the environmental positioning information corresponding to the virtual floor.

In an embodiment, the sensing information provided by the operation target contains an inertial measurement unit information, which reflects a direction of initial motion of the operation target, each virtual floor is divided into a plurality of valid work zones, and there is a non-continuous portion between the valid work zones.

In an embodiment, the computing device is further configured to analyze the inertial measurement unit information contained in the sensing information, determine the direction of initial motion of the operation target according to the inertial measurement unit information, and fuse the inertial measurement unit information to the environmental positioning information to navigate the operation target to cross over the non-continuous portion.

In an embodiment, the sensing information provided by the operation target contains an image information, there is an auxiliary marking object at a predefined target position of the field, and the auxiliary marking object is presented in the image information.

In an embodiment, the computing device is further configured to analyze the image information contained in the sensing information, determine whether the auxiliary marking object matches the predefined pixel range and outline according to the image information, and fuse the image information to the environmental positioning information, so that the operation target may be navigated to the predefined target position.

According to the embodiments of the present disclosure, an improved positioning system for UAM and a positioning method thereof are provided. An image information obtained using monocular environmental camera is fused to the sensing information of the UAM, so that a high-accuracy positioning function may be performed. According to the embodiments of the present disclosure, no need to shot the specific marks on the UAM, using several high-speed cameras from several angles. Furthermore, no need to perform SLAM function of UAM itself. Therefore, the present disclosure may provide a positioning method having a lower cost and a wider covering range, without adding extra weight to the UAM (i.e., extra weight is caused by installing complicated sensors on the UAM).

It will be apparent to those skilled in the art that various modifications and variations may be made to the disclosed embodiments. It is intended that the specification and examples be considered as exemplary only, with a true scope of the disclosure being indicated by the following claims and their equivalents.

What is claimed is:

1. A positioning system, for providing an environmental positioning information of a field using monocular vision, wherein the field has a plurality of virtual floors corresponding to different heights, each of the virtual floors has a plurality of marking positions, the positioning system comprising:
a computing device, configured to generate the environmental positioning information according to a first environmental image of the field, wherein the environmental positioning information has a positioning accuracy for the marking positions of each of the virtual floors, and the positioning accuracy has various levels; and
a first camera, configured to generate a marking image of a marking object, wherein the marking object is placed at a corresponding one the marking positions of the virtual floors, and the first camera is further configured to capture an accuracy positioning pattern and a plurality of positioning points of the marking object based on the marking image,
wherein the computing device is further configured to analyze the accuracy positioning pattern and the positioning points of the marking object, analyze a mapping relationship between the marking image and the marking object, evaluate the positioning accuracy based on the accuracy positioning pattern, the positioning points and the mapping relationship, and divide each of the virtual floors into a plurality of work zones according to the positioning accuracy; and
wherein the computing device is further configured to map the positioning points of the marking object to a plurality of pixels of the marking image, calculate a mean error of a plurality of coordinate positions of the pixels of the marking image, and evaluate the positioning accuracy according to the mean error.

2. The positioning system according to claim 1, wherein the first camera is further, configured to generate the first environmental image of the field which includes the marking image corresponding to each of the marking positions.

3. The positioning system according to claim 1, wherein the computing device is further configured to perform a lens distortion correction to correct the coordinate positions of the pixels mapped from the positioning points and calculate the mean error according to the coordinate positions which are corrected.

4. The positioning system according to claim 1, wherein the marking object has a predefined pattern, the predefined pattern includes a plurality of grids, and the positioning points of the marking object include junctions of the grids.

5. The positioning system according to claim 1, wherein one of the marking positions has a global navigation satellite system (GNSS) information, the computing device is further configured to calculate the coordinate positions of the pixels mapped from the positioning points according to the GNSS information.

6. The positioning system according to claim 1, wherein the computing device is further configured to divide the work zones according to the mean error;
when the mean error is greater than a first error threshold, the positioning accuracy corresponding to the work zones is at a "failed positioning" level;
when the mean error is less than the first error threshold and is greater than the second error threshold, the positioning accuracy corresponding to the work zones is at a "low positioning accuracy" level; and when the mean error is less than the second error threshold, the positioning accuracy corresponding to the work zones is at a "high positioning accuracy" level.

7. The positioning system according to claim 6, wherein the marking object has a predefined pattern, the predefined pattern has a color information, the computing device is further configured to evaluate an environmental illuminance of the field according to the color information and divide the work zones according to the environmental illuminance.

8. The positioning system according to claim 1, wherein the marking object has a predefined pattern, the predefined pattern has a boundary information, the computing device is further configured to mark a plurality of boundary lines of the work zones according to the boundary information.

9. The positioning system according to claim 1, further comprises:
a second camera, configured to generate a second environmental image of the field, the second environmental image and the first environmental image have an overlapped area,
wherein, the computing device is further configured to stitch the first environmental image and the second environmental image to cover the field.

10. A positioning method, for providing an environmental positioning information of a field using monocular vision, wherein the field has a plurality of virtual floors corresponding to different heights, each of the virtual floor has a plurality of marking positions, the positioning method comprising the following steps:
generating the environmental positioning information according to a first environmental image of the field by a computing device, wherein the environmental positioning information has a positioning accuracy for the marking positions of each of the virtual floors, and the positioning accuracy has various levels;
generating a marking image of a marking object by a first camera, wherein the marking object is placed at a corresponding one the marking positions of the virtual floors;
capturing an accuracy positioning pattern and a plurality of positioning points of the marking object based on the marking image, by the first camera;
analyzing the accuracy positioning pattern and the positioning points of the marking object, by the computing device;
analyzing a mapping relationship between the marking image and the marking object, by the computing device;
evaluating the positioning accuracy based on the accuracy positioning pattern, the positioning points and the mapping relationship, by the computing device;
dividing each of the virtual floors into a plurality of work zones according to the positioning accuracy, by the computing device;
mapping the positioning points of the marking object to a plurality of pixels of the marking image, by the computing device; and
calculating a mean error of a plurality of coordinate positions of the pixels of the marking image, and evaluating the positioning accuracy according to the mean error, by the computing device.

11. The positioning method according to claim 10, further comprises the following steps:
generating the first environmental image of the field which includes the marking image corresponding to each of the marking positions.

12. The positioning method according to claim 10, wherein, the step of calculating the mean error of the coordinate positions comprises:
performing a lens distortion correction to correct the coordinate positions of the pixels mapped from the positioning points; and
calculating the mean error according to the coordinate positions which are corrected.

13. The positioning method according to claim 10, wherein the marking object has a predefined pattern, the predefined pattern includes a plurality of grids, the positioning points of the marking object include junctions of the grids.

14. The positioning method according to claim 10, wherein one of the marking positions has a GNSS information, the positioning method further comprises the following steps:
calculating the coordinate positions of the pixels mapped from the positioning points according to the GNSS information.

15. The positioning method according to claim 10, further comprises the following steps:
dividing the work zones according to the mean error;
wherein, when the mean error is greater than a first error threshold, the positioning accuracy corresponding to the work zones is at a "failed positioning" level;
when the mean error is less than the first error threshold and is greater than the second error threshold, the positioning accuracy corresponding to the work zones is at a "low positioning accuracy" level; and
when the mean error is less than the second error threshold, the positioning accuracy corresponding to the work zones is at a "high positioning accuracy" level.

16. The positioning method according to claim 15, wherein the marking object has a predefined pattern, the predefined pattern has a color information, the positioning method further comprises the following steps:
evaluating an environmental illuminance of the field according to the color information; and
dividing the work zones according to the environmental illuminance.

17. The positioning method according to claim 10, wherein the marking object has a predefined pattern, the predefined pattern has a boundary information, the positioning method further comprises the following steps:
marking a plurality of boundary lines of the work zones according to the boundary information.

18. The positioning method according to claim 10, further comprises the following steps:
generating a second environmental image of the field, the second environmental image and the first environmental image have an overlapped area; and
stitching the first environmental image and the second environmental image to cover the field.

* * * * *